(12) United States Patent
Dahlen et al.

(10) Patent No.: US 7,143,005 B2
(45) Date of Patent: Nov. 28, 2006

(54) IMAGE RECONSTRUCTION METHOD

(75) Inventors: Gregory A. Dahlen, Santa Barbara, CA (US); William Foreman, Santa Barbara, CA (US)

(73) Assignee: Veeco Instruments Inc., Woodbury, NY (US)

( * ) Notice: Subject to any disclaimer, the term of this patent is extended or adjusted under 35 U.S.C. 154(b) by 17 days.

(21) Appl. No.: 10/944,333

(22) Filed: Sep. 17, 2004

(65) Prior Publication Data

US 2005/0043917 A1    Feb. 24, 2005

Related U.S. Application Data

(63) Continuation-in-part of application No. 10/139,949, filed on May 6, 2002, now Pat. No. 6,810,354.

(51) Int. Cl.
*G01B 15/04* (2006.01)

(52) U.S. Cl. .................. 702/168; 250/306; 702/167

(58) Field of Classification Search .............. 702/127, 702/155, 158, 162, 166–168; 73/104, 105; 250/306, 307, 252.1; 382/128
See application file for complete search history.

(56) References Cited

U.S. PATENT DOCUMENTS 6,489,611 B1 * 12/2002 Aumond et al. ............ 250/306
6,810,354 B1 * 10/2004 Dahlen ...................... 702/168

* cited by examiner

*Primary Examiner*—Bryan Bui
*Assistant Examiner*—John Le
(74) *Attorney, Agent, or Firm*—Boyle Fredrickson Newholm Stein & Gratz S.C.

(57) ABSTRACT

A method of extracting the shape of a probe tip of a probe-based instrument from data obtained by the instrument is provided. The method employs algorithms based on the principle that no reconstructed image points can physically occupy the same region as the tip during imaging. Sequential translates of the tip shape or volume sweep out an area or volume that is an "exclusion zone" similar to morphological erosion. The embodiments of the alternative method use either the region defined by the tip boundary or simply the tip boundary.

20 Claims, 31 Drawing Sheets

IMAGE RECONSTRUCTION METHOD

RELATED PATENT APPLICATIONS

The present application is a continuation-in-part (CIP) of U.S. patent application Ser. No. 10/139,949 filed May 6, 2002, now U.S. Pat. No. 6,810,354, and hereby incorporated by reference herein.

BACKGROUND OF THE INVENTION

1. Field of the Invention

The present invention is directed to scanning probe microscopes (SPMs), and more particularly, to alternate methods of accounting for the shape of the probe tip in the acquired image, the methods being particularly adapted for measuring critical dimensions (CD) and features of semiconductor wafers, data recording media, and related.

2. Description of Related Art

Several known probe-based instruments monitor the interaction between a cantilever-based probe and a sample to obtain information concerning one or more characteristics of the sample. For example, SPMs, such as the atomic force microscope (AFM), are devices which typically use a sharp tip and low forces to characterize the surface of a sample down to atomic dimensions. More particularly, SPMs monitor the interaction between the sample and the tip (where the tip is typically mounted on the cantilever of the probe). By providing relative scanning movement between the tip and the sample, surface characteristic data can be acquired over a particular region of the sample, and a corresponding map of the sample can be generated.

The atomic force microscope (AFM) is a very popular type of SPM. The probe of the typical AFM includes a very small cantilever which is fixed to a support at its base and which has a sharp probe tip extending from the opposite, free end. The probe tip is brought very near to or into contact with a surface of a sample to be examined, and the deflection of the cantilever in response to the probe tip's interaction with the sample is measured with an extremely sensitive deflection detector, often an optical lever system such as described in Hansma et al. U.S. Pat. No. RE 34,489, or some other deflection detector such as strain gauges, capacitance sensors, etc. The probe is scanned over a surface using a high resolution three axis scanner acting on the sample support and/or the probe. The instrument is thus capable of creating relative motion between the probe and the sample while measuring the topography or some other surface property of the sample as described, e.g., in Hansma et al. U.S. Pat. No. RE 34,489; Elings et al. U.S. Pat. No. 5,226,801; and Elings et al. U.S. Pat. No. 5,412,980.

AFMs may be designed to operate in a variety of modes, including contact mode and oscillating mode. In contact mode operation, the microscope typically scans the tip across the surface of the sample while keeping the force of the tip on the surface of the sample generally constant. This effect is accomplished by moving either the sample or the probe assembly vertically to the surface of the sample in response to sensed deflection of the cantilever as the probe is scanned horizontally across the surface. In this way, the data associated with this vertical motion can be stored and then used to construct an image of the sample surface corresponding to the sample characteristic being measured, e.g., surface topography. Alternatively, some AFMs can at least selectively operate in an oscillation mode of operation such as TappingMode™. (TappingMode™ is a trademark of the present assignee.) In oscillation mode, the tip is oscillated at or near a resonant frequency of the cantilever of the probe. The amplitude or phase of this oscillation is kept constant during scanning using feedback signals, which are generated in response to tip-sample interaction. As in contact mode, these feedback signals are then collected, stored, and used as data to characterize the sample.

Regardless of their mode of operation, AFMs can obtain resolution down to the atomic level on a wide variety of insulating or conductive surfaces in air, liquid or vacuum by using piezoelectric scanners, optical lever deflection detectors, and very small cantilevers fabricated using photolithographic techniques. Because of their resolution and versatility, AFMs are important measurement devices in many diverse fields ranging from semiconductor manufacturing to biological research.

Notwithstanding the fact that scanning probe microscopes are high resolution instruments, the ultimate resolution of the data obtained by such probe-based instruments is limited by the physical characteristics of the tip of the probe itself. More particularly, there are limitations as to how small, and sharp, the tip can be made. In view of this, the tip shape is reflected in the acquired data, a problem that is exacerbated by the fact that AFMs often image very small (e.g., Angstrom scale) features. As a result, an error in the acquired data results and the corresponding accuracy of the surface image is significantly compromised. Hereinafter, the acquired SPM image will periodically be called the "dilated" image.

For some applications, this limitation may be negligible. However, for many applications, the degree of accuracy required to resolve the features of the sample surface is significantly greater, such that tip shape error is unacceptable. For instance, in the semiconductor fabrication industry, imaging features such as lines, trenches and vias with single nanometer accuracy is desired. These features may have dimensions in the range of about 90 nm, and are continually getting smaller. With typical tip widths in the range of about 70 nm, the tip shape clearly introduces significant error in the data and must be removed to accurately image the sample surface.

Moreover, the aforementioned problems can be exacerbated by the fact that complex sample surface topologies require a commensurate increase in tip shape complexity to image such surfaces. For example, samples may include undercut regions where a particular x,y scan position may have multiple "Z" height values (see region "U" in FIG. 1, discussed in further detail below). Again, this is common in the semiconductor fabrication industry, and thus tips have been developed to allow imaging of such complex topographies. However, with the increase in tip shape complexity, there typically is a corresponding increase in error in the AFM data.

Two types of known tip shapes are illustrated in FIGS. 1 and 2. Note that probe tips, such as the CD tip, shown in FIG. 2, typically will not have the smooth symmetrical shapes illustrated in the figures. These tip shapes are merely presented as such to highlight the concepts and features of the preferred embodiment. In FIG. 1, a probe tip 10 of a traditional scanning probe microscope includes a parabolic, or other pointed shape that is relatively easy to characterize. Tip 10 includes a shaft 12 and a distal end 14 that although sharp is typically at least slightly rounded at its active surface 15. During a scan (operating in an oscillating mode, for instance), tip 10 interacts with a sample surface 16 to image characteristics of that surface. Tip-sample interaction is controlled, and data is collected, via a control system (not shown) as described previously. The collected data, in turn, may be plotted to image the sample surface. Importantly, this acquired image may not accurately reflect sample surface characteristics due to, among other things, the error introduced by the shape of the pointed tip.

In addition to introducing at least some tip shape error in the acquired data, probe tip 10 is unable to image certain surfaces. In particular, although suitable for many applications, based on its shape probe tip 10 is simply unable to accurately depict vertical sidewalls and undercut regions (which often exist in semiconductor fabrication, for example) in the corresponding sample surface topography. Notably, this is due to limitations in both the tip shape and the algorithms used to control tip position.

To be able to image surface features such as vertical sidewalls and undercut regions, AFMs having more complex probe tips have been developed. In one such instrument, shown in FIG. 2, an AFM employs active X-Z control to follow complex surface topography using a probe tip 20 having a shaft 22 and a distal end 24 including left and right protuberances 26, 28, respectively, in the scan (for example X) direction. By dithering the tip in the scan direction, protuberances 26, 28 are caused to interact with surface features such as vertical sidewalls. As a result, what before caused "shaded regions" (i.e., regions of no tip-sample contact such as undercut region "U" illustrated in FIGS. 1 and 2) in the acquired AFM data, now yields at least some data based on tip-sample contact. However, with this increase in flexibility of the types of samples that can be imaged, correcting and reconstructing the image data becomes increasingly difficult.

Overall, whether employing simple or complex probe tip shapes, the problem of the shape of the tip being convolved in the AFM data has been known and appreciated in the art. Although solutions have been attempted with some success for conventional AFMs, extracting tip shape errors from CD AFM data has been an inexact process. Moreover, as features become smaller, and because the tip is at least somewhat limited in just how small it can be made, the convolution of the tip in the image data becomes more substantial, and thus it is becoming increasingly important that the tip shape be removed for accurate measurements.

In another known and widely used technique, particularly applicable to the above-described CD probe shown in FIG. 2, rather than applying shape "deconvolution" of the image to compensate for the effect of dilation of the image, a simple subtraction of the tip-width in the scan direction can provide improved reconstructed images and critical dimension measurements.

For this technique to provide a useful correction, the width of the CD tip must be determined to a high degree of accuracy. The way in which this is typically accomplished is by scanning a silicon nanoedge with, for example, the boot shaped CD tip shown in FIG. 2. Because the dimensions of the nanoedge are known or at least very closely approximated, the width of the tip can be extracted from the image data. This scan of a silicon nanoedge is illustrated in FIG. 3A. In particular, a CD tip (for example, 20 in FIG. 2) is scanned from left to right over an improved silicon nanoedge (ISNE) 31 so as to produce an image data profile 30. In this method, the width of the tip is calculated according to, $$W_{tip} = L - (W_1 + W_2) \quad \text{Equation 1}$$

where "L" is the total width of the acquired image a vertical distance "D" (defined below) from the plateau. $W_1$ and $W_2$ are defined as follows, $$W_1 = (D-r)\tan\alpha + r \quad \text{Equation 2}$$

and $$W_2 = (D-r)\tan\beta + r. \quad \text{Equation 3}$$

In these equations, "D" is the distance from the plateau "P" of the scanned image used for measuring the angles $\alpha$ and $\beta$, as illustrated in FIG. 3. For example, this value may be approximately 800 angstroms. In addition, "r" is the radius of the vertex of the ISNE, estimated by SEM, TEM and/or sharp tip SPM analysis of the nanoedge, and is approximately 75 angstroms. The angles $\alpha$ and $\beta$ are the angles computed from the left and right side slopes, respectively, of the previous tip calibration analysis. Computing the tip width in this fashion, this prior art method can be used to subtract off that width from the image data generated during a scan to approximately correct for the error in the image data. Although providing a correction, this method has significant drawbacks.

First, by simply subtracting the tip width from the image data, it is assumed that the tip-sample contact is being made at a particular point, for example, at the vertical tangent of the protuberances of the boot shaped or CD tip (i.e., at point 29, FIG. 2). However, as the tip scans along a particular topography, the contact point of the tip on the sample translates along the surface of the tip and thus the effective width of the tip at the contact point changes. As a result, a single-valued tip width subtraction is inexact. By simply subtracting off a single value tip-width, an error remains in the reconstructed image as each feature of a unique tip shape cannot be fully accounted for in correcting AFM image data. These errors are directed to inaccuracies in the image of the sample surface shape for both topology and CD width measurements at a particular height. Another significant drawback is that the width defined in Equations 2 and 3 set forth above are merely estimates for the actual tip width. As the samples to be imaged continue to demand greater resolution, these equations will become inadequate even for those applications where tip-width correction provides an acceptable correction.

In short, for the applications contemplated by the present invention, no known technique sufficiently accounts for the tip shape when reconstructing CD AFM image data.

For reconstructing non-reentrant, relatively simple topologies, the methods using local slope-matching between the acquired image data and the tip profile have been attempted. A drawback of slope-matching, or "slope-based," reconstruction methods is that Legendre transforms used in the analysis, which require numerical derivatives of the data, can be highly sensitive to noise in the original image data. A "smoothing" technique may be implemented to reduce the noise enough to allow reconstruction, but such smoothing typically eliminates sharp features, which are often critical to accurate reconstruction.

A known method to reduce the negative effects of noise is use of a median filter in pre-processing image data prior to slope-based reconstruction of the image data. However, due to inherent limitations, the use of median filters alone does not solve the problem of noise amplification and artifact generation in the reconstructed image. Certain known techniques to smooth or reduce noise can also eliminate crucial features in an image, thereby causing false image reconstruction.

In view of the above drawbacks with known methods of smoothing and pre-filtering original image data, an improved method is desired to reduce noise and artifacts prior to image reconstruction. In addition, alternative methods of image reconstruction particularly adapted for reconstructing complex surfaces using complex probes were also desired.

SUMMARY OF THE INVENTION

The preferred embodiment overcomes the drawbacks of slope-based image reconstruction systems by providing a method of post-filtering re-constructed data points that more easily analyzes and corrects inconsistent image data obtained with a scanning probe microscope tip in an efficient manner that improves the visual rendering of the reconstructed surface and improves both repeatability and accuracy of the reconstructed image surface.

According to a preferred embodiment, a method of slope-based image reconstruction of a re-entrant surface topology employing a scanning probe microscope is provided. The method generates a slope based reconstructed image using the data obtained by a tip of the scanning probe microscope. The data is indicative of, for example, a characteristic of a re-entrant surface topology of a sample. The step of generating a slope-based reconstructed image includes calculating a slope and an indication of a direction of the slope of the image at a particular region and determines, using the slope and the indication of direction, a probe contact point between the tip and the sample at that region. The method further includes the steps of applying a geometric shape filter configured to eliminate reconstructed image data that are not consistent with a tip shape of the probe used to capture the image; and applying a median filter configured to reduce artifacts in the reconstructed data. The step of applying the median filter is preferably conducted to reconstruct vectors during extraction vector selection based on known tip shape parameters.

Overall, the method of image reconstruction in accordance with the present invention enhances a reconstructed image by reducing noise and artifacts associated with noise in the original image data. Thereby, less filtering is required of the original image data and, in some cases, post-processing of the "reconstructed" image data may not be necessary. The invention is also particularly directed to alternative methods to the slope-base method that provide the capability to reconstruct a re-entrant sample surface.

According to one aspect of the preferred embodiment, a method of slope-based image reconstruction from data obtained by a tip of a scanning probe microscope is provided. The method generates a slope based reconstructed image using the data, wherein the data is indicative of a characteristic of a surface of a sample. The step of generating a slope-based reconstructed image includes calculating a slope of the image and an indication of direction of the slope at a particular region and determines, using the slope and indication of slope direction, a probe contact point between the tip and the sample at that region. Preferably, a smoothing of the reconstructed data is performed.

According to another aspect of this preferred embodiment, the present invention provides alternative methods to and of the slope based method for performing image reconstruction of data obtained by a tip of a surface scanning microscope. The alternative methods employ algorithms based on a principle that no reconstructed image points can physically occupy the same region as the tip during imaging. Sequential translates of the tip shape or volume sweep out an area or volume that is an "exclusion zone" similar to morphological erosion. The embodiments of the alternative methods use either the region defined by the tip boundary or simply the tip boundary.

According to a further alternate embodiment, a method of image reconstruction of data obtained by a scanning probe microscope (SPM) having a tip includes steps of using the SPM to acquire the data, wherein the data is indicative of a characteristic of a surface of a sample. Then, the method includes mapping all points associated the probe profile translates into a reconstructed image; and applying a geometric type post-filter to exclude all points that fall within successive translate profiles. A preferred probe includes a first and a second region. The first region includes an ellipsoidal contact region. The second region includes a supporting rectangular stalk.

In a still further alternate embodiment, a method of image reconstruction of data obtained by a scanning probe microscope having a tip includes the step of acquiring the image data representative of the sample topography with the scanning probe, the image data including an array of pixel data. In addition, the method includes determining a morphological state of the pixel data by applying morphological tests at the boundary pixels. The method next includes mapping a first idealized probe profile representative of the probe tip at a location of a first acquired image data, and a second idealized probe profile representative of the probe tip at a location of a second acquired image data. Thereafter, each pixel data falling within an interior region defined by the first idealized probe profile is identified and excluded. Lastly, the method includes repeating the above steps for a plurality of subsequent idealized probe profiles with respect to the image data so as to generate residual image data representative of the sample topography.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENT

The preferred embodiments are directed toward improved methods of correcting reconstructed image data obtained with a scanning probe microscope by accurately accounting for probe tip shape in reconstructing the image of the sample surface. More particularly, the preferred method determines the actual point of contact of the probe tip on the sample surface for several points in a dilated image profile, corrects inconsistent image data with the tip shape used to capture the image data that improves the visual rendering of the reconstructed surface and improves both repeatability and accuracy of the reconstructed image surface. The present embodiment also provides alternate methods of image reconstruction.

Image Correction Using Point of Tip Contact Determination

Figure 4A:
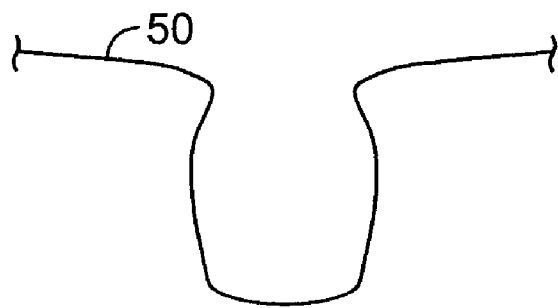
FIGS. 4A–4C are side elevational schematic views of a sample, an AFM image profile superimposed thereon, and a reconstructed image profile of the sample surface provided by the preferred embodiment, respectively.
Figure 4B:
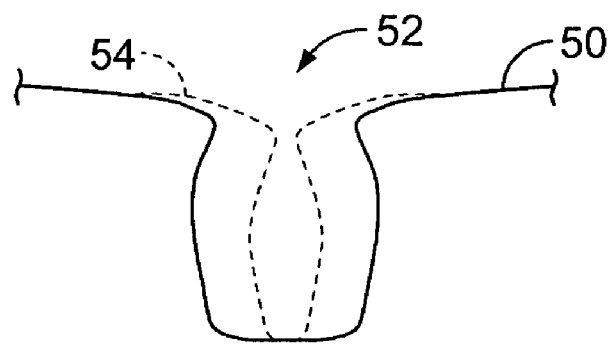
Figure 4C:
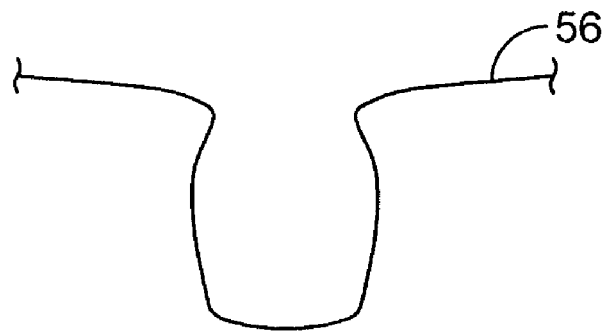

Turning initially to FIG. 4A–4C, a sample 50 to be scanned by an AFM, as well as the resulting "raw" or dilated image data 54, are shown schematically together with the desired corrected image data 56. In particular, sample 50 shown in FIG. 4A includes a trench 52 (FIG. 4b) produced according to a semiconductor fabrication process and having a particular height and width whose dimensions are in the nanoscale range. Notably, trench 52 has a relatively complex topography including vertical sidewall positions and undercut regions.

Figure 1:
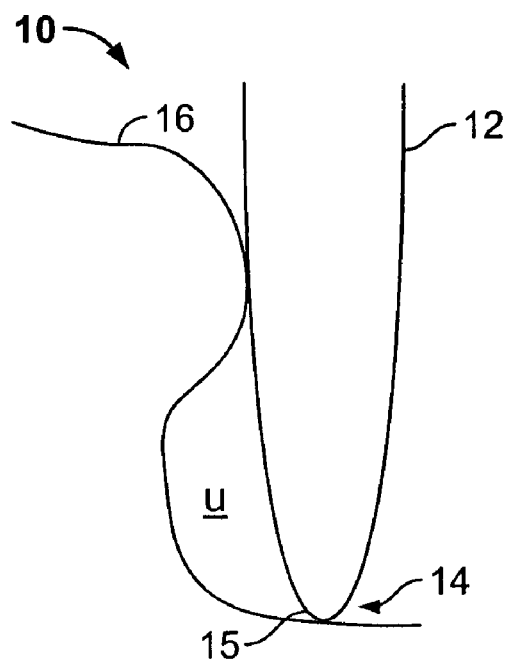
FIG. 1 is a side elevational schematic view of a prior art probe tip interfacing with a sample having a complex topography.
Figure 2:
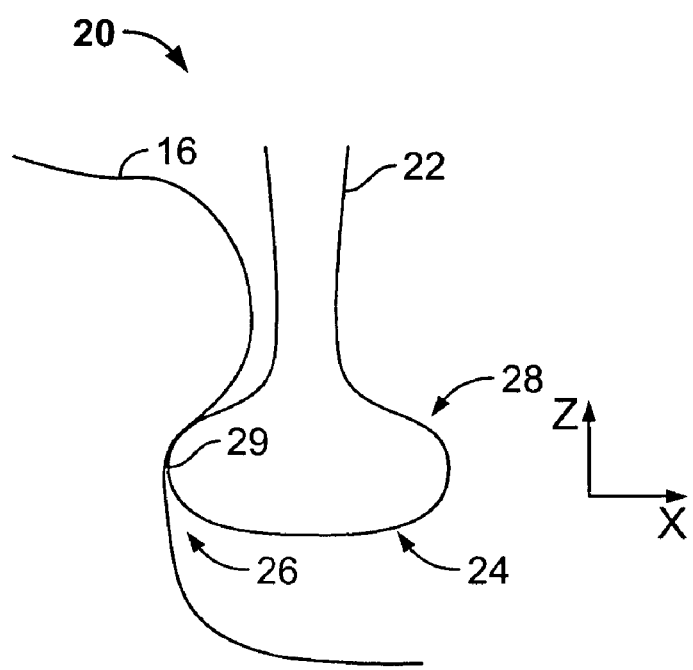
FIG. 2 is a side elevational schematic view similar to FIG. 1, illustrating a CD probe tip adapted to image sample surfaces having complex topographies.

Sample 50 is supported by on a sample holder of the SPM, so as to allow the sample to be engaged by an SPM tip (20 in FIG. 2, for example). As the SPM tip scans sample 50, image data is acquired and stored for further analysis by the user. This data profile 54 is illustrated in FIG. 4B as the dashed lines superimposed on the profile of sample 50 shown in FIG. 4A. Notably, the image 54 is dilated from the actual sample topography due to the fact that the shape of the tip is reflected in the data. The preferred embodiment operates to remove this error so that the dilation is essentially eliminated and a true image 56 of sample 50 under test can be obtained, as shown in FIG. 4C. Note that the preferred embodiment is based on tip sample contact, and that the reconstructed image will be dilated in those regions where no tip-sample contact occurs, e.g., when a dimension of the probe tip is insufficient to contact a sample having a severely undercut region (FIGS. 1 and 5).

To achieve the reconstructed image shown in FIG. 4C, the preferred embodiment implements a method whereby the geometry associated with the point of contact of the probe tip on the sample surface is exploited. Note that the principles of the preferred embodiment are presented herein using a CD tip. This is being done for illustrative purposes only, and the invention can be implemented when using probe tips of any shape.

Figure 5:
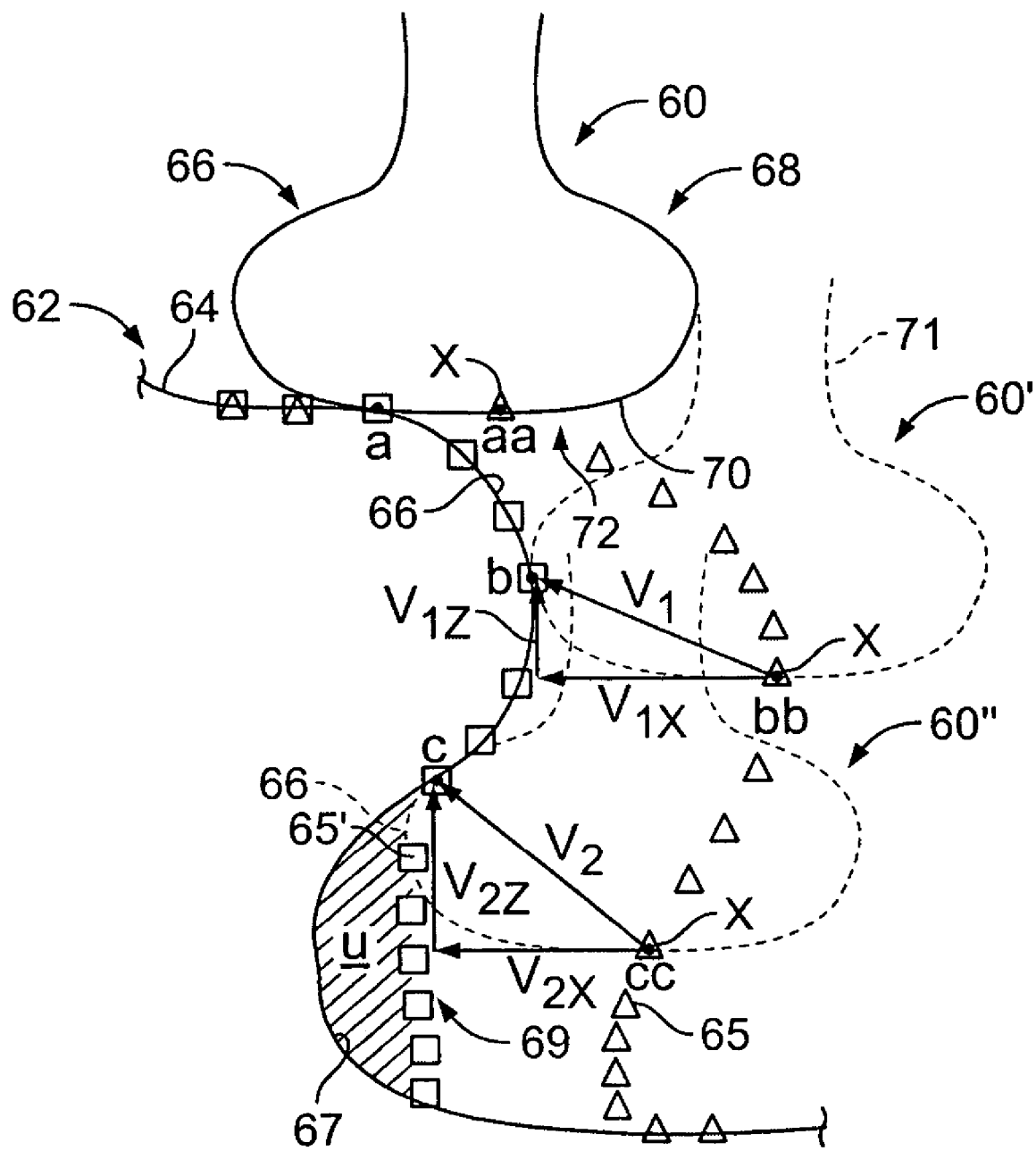
FIG. 5 is a side elevational schematic view of tip-sample contact at three separate positions during a scan, illustrating correction vectors obtained using the method of the preferred embodiment.

Turning to FIG. 5, a boot-shaped (CD) probe tip 60 of an AFM is scanned across a surface 64 of a sample 62. Probe tip 60 includes left and right protuberances 66, 68, respectively, that along with bottom surface 70 of a distal end 72 define the active regions of tip 60. The scan shown was conducted from upper left to lower right along a trench wall 66, thus obtaining the data represented by the series of triangles. Notably, the acquired data represented by the triangles is the dilated data that must be corrected to account for the shape of tip 60.

It is important to note that the dilated data (illustrated by the series of triangles) is generated using a fixed reference point for tip 60, for example, the mid-point "x" of tip 60 at its distal end 72. Importantly, this reference point "x" is typically displaced from the contact point of tip 60 on the sample surface 64, the contact point itself translating along the surface of tip 60 as a scan progresses, as noted previously. As the tip interacts with the sample surface, the reference point translates in the scan direction to generate the dilated image corresponding to surface characteristics of the sample.

With continued reference to FIG. 5, probe tip 60 is shown in three positions as it progresses from left-to-right in the scan direction. Like pairs of letters, for example, a-aa, represent the point of contact between probe tip 60 and sample 62, and the corresponding position of the selected reference point (i.e., "x") on the AFM tip used to produce the dilated image profile, respectfully. As such, notably, the distance and direction (i.e, vector) between the points of each pair (e.g., a-aa, b-bb and c-cc) is the amount by which the AFM image data must be corrected to produce the desired reconstructed image. The preferred embodiment provides this correction, as illustrated by the series of square blocks in FIG. 5.

Two of the correction vectors applied according to the present invention are shown. When it is at position 60', tip 60 contacts sample 62 at point "b," and reference point "x" is at "bb." The preferred embodiment operates to correct the difference between these two points (i.e., the dilation) by analyzing tip-sample surface normals (described below) to identify a correction factor, for example, a correction vector $V_1$, having orthogonal components $V_{x1}$ and $V_{z1}$. Similarly, when tip 60 is at position 60'', it contacts sample 62 at point "c," thus generating data image point "cc." Method 80 (FIG. 7) operates to determine and apply correction vector $V_2$ to translate point "cc" to "c," Thus extracting the shape of tip 60 at the contact point "c" from the dilated image.

As discussed in further detail below, the vertical portion of the dilated image data, and the corresponding vertical portion 69 of the reconstructed image (i.e., square blocks) at about the undercut region "U" of sample 62 is caused by a shaft 71 of tip 60 contacting surface 64 of sample 62 at about point "b" of sample 62. In other words, left side 66 of tip 60 does not contact sample 62 at about point 65 of the image data. As a result, with shaft 71 contacting the overhang, the portion of the undercut region "U" to the left of the vertical line of square blocks (i.e., corrected data) is "shaded," due to no tip-sample contact in that region.

Figure 6:
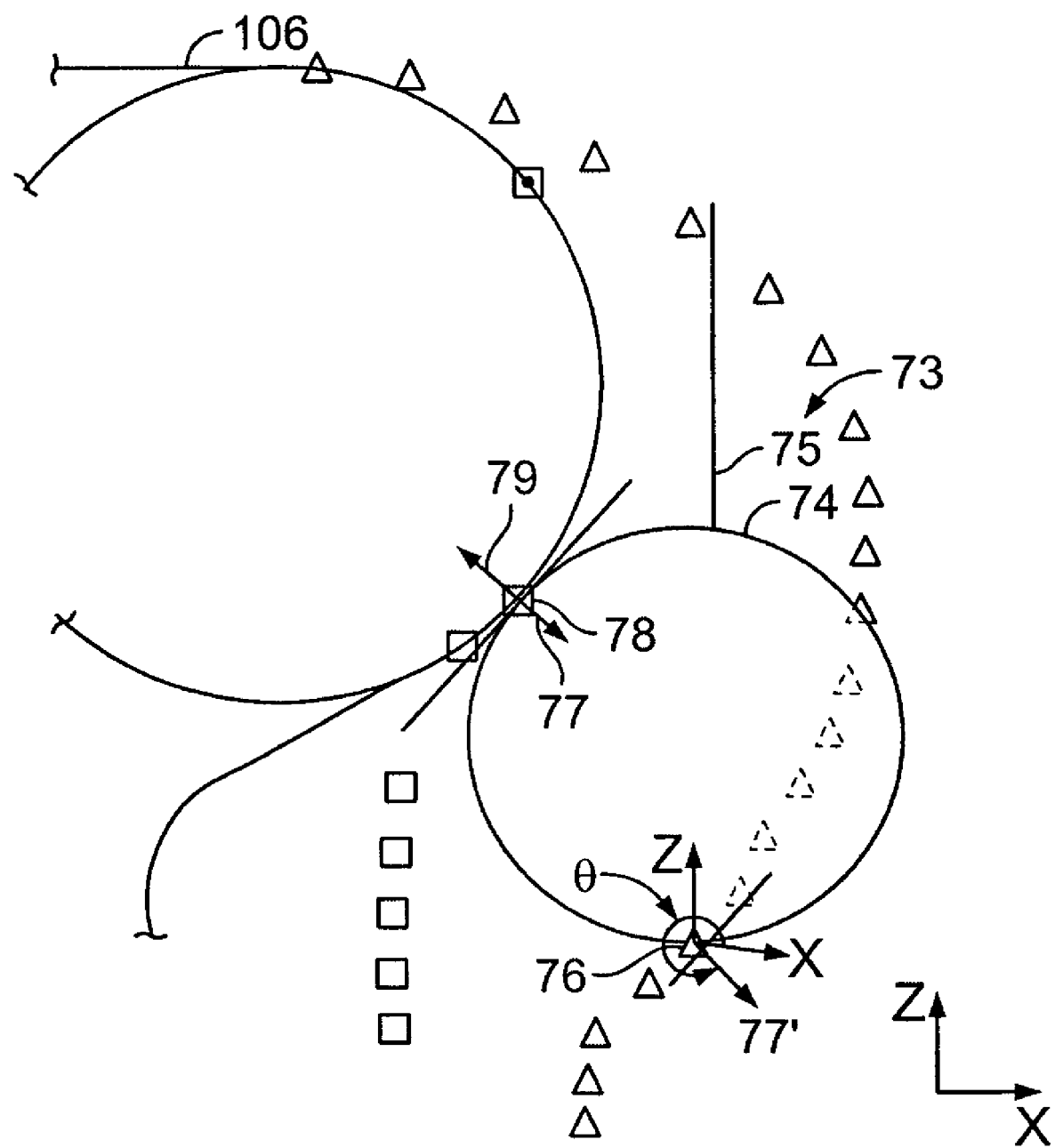
FIG. 6 is a side elevational view schematically illustrating tip-sample contact at a particular point.

Turning to FIG. 6, the geometry of tip-sample interaction during AFM data acquisition is shown. To illustrate this geometry for any particular point of contact between probe tip 74 (schematically shown coupled to shaft 75 of probe 73) and sample 106, sample 106 and probe tip 74 can be shown idealized in 2-D cross-section as circles, whereby a point of contact 78 sits in a tangential plane at the interface of the two structures. Importantly, at point of contact 78, the surface normals 77, 79 to the tangential plane are equal (and opposite) for sample 106 and probe 73, respectively. When utilizing a tip that has a shape defining surface points characterized by a series of unique surface normals (as in FIG. 6), these surface normals can be compared to the AFM image data to identify the exact point of contact of the tip on the surface. Note that "equal surface normals" indicates that the normals extend in the same direction.

More particularly, the tip shape at each point is reflected in the data recorded by the SPM as the slope and indicated slope direction of the data at that point. By computing the slope and indicated slope direction of the SPM image data (for example, relative to the scan direction or the X axis of the X-Z plane) and knowing the scan direction, the image unit surface normal at point 76 is 77'. At the tip sample contact point, the sample unit surface normal 77 is the same. And, with this information, the point of contact of the tip on the sample can be determined. Again, the surface normal 79 associated with the probe tip contact point will be equal to and opposite of the sample unit surface normal 77. By knowing surface normal 79, an appropriate correction vector (previously computed upon characterization of the probe tip) associated with surface normal 79 can be applied to point 76.

For example, with continued reference to FIG. 6, projecting unit surface normal 77 to dilated image point 76 yields sample unit surface normal 77' which can be identified by measuring the angle θ it defines relative to the scan (X) direction, or about 315°. The probe tip surface normal 79 at this point is equal and opposite and thus is about 135° relative to the scan direction. Because the contact points of the probe tip are initially characterized and stored (in this case, according to the angle their corresponding surface normal makes to the scan direction), and corresponding correction factors have been computed, the appropriate correction factors can be readily determined and applied to the dilated data point. In this case, the point on the tip that has a surface normal that is 135° relative to the scan direction will be stored as such with an appropriate correction factor, for example (−4 nm, +7 nm) in the X-Z coordinate system.

As highlighted previously, as the SPM continues to scan the sample, the point of contact translates along the tip surface, thus typically defining a new tangential plane, and a new surface normal. Because the present invention is able to determine this point of tip contact at each point in the scan data (assuming unique surface normals associated with the active region of the tip), appropriate correction vectors for each scan point can be determined and a reconstructed image of the sample surface can be generated. As a result, the dilation error introduced by the tip shape is essentially eliminated.

In sum, because the tip shape is convolved in the SPM image data and the surface normal of the contact point of the tip is equal and opposite to the sample surface normal at that point, the point of contact of the tip on the sample can be determined. This is achieved by computing the local slope of the SPM image data which corresponds to the single point of contact of the tip on the sample, and then by identifying a corresponding surface normal. As correction vectors associated with the identified surface normals are determined using the data corresponding to the point of tip contact on a point-by-point basis, a reconstructed image having a high degree of accuracy can be achieved in a way that is not computationally intensive.

Figure 7:
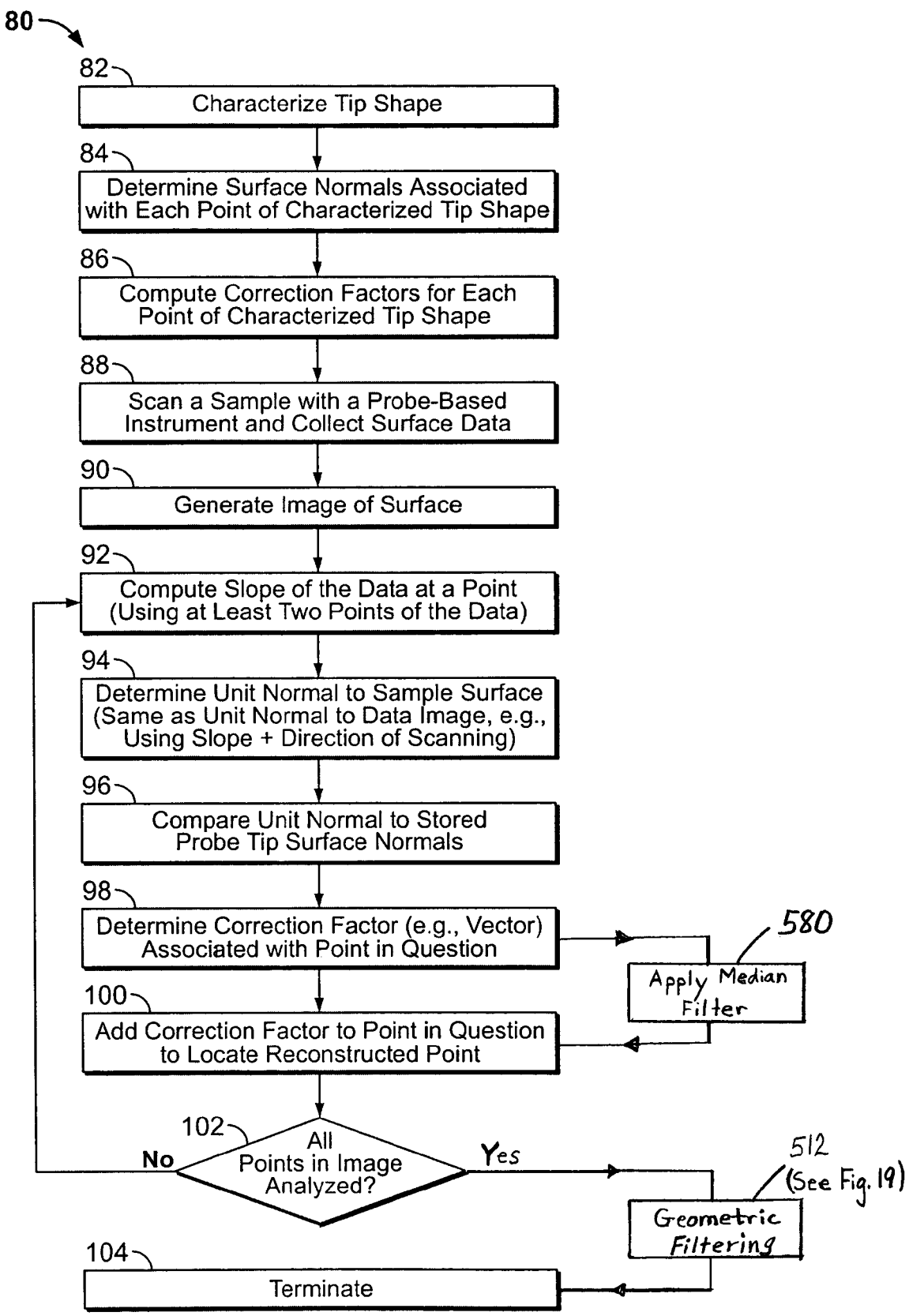
FIG. 7 is a flow diagram illustrating a method of the preferred embodiment.

In this regard, a method 80 of the preferred embodiment is shown in FIG. 7. Initially, in Step 82, the shape of the tip employed is characterized. More particularly, the potentially active regions of the surface of the tip are characterized on a point-by-point basis using any one of a number of techniques. For example, Step 82 may include scanning the tip over a calibration structure that allows reconstruction of the probe tip geometry. One type of calibration structure is an improved silicon nanoedge (ISNE) discussed above in conjunction with known tip-width correction techniques. The ISNE may be placed on a scanning sample holder that is positioned in a chamber of, for example, a scanning probe microscope (SPM) that allows imaging of the sample without loading or unloading. The ISNE has a known height (e.g., h=0.8 microns±0.2 microns), an estimated radius (e.g., r=7.5 nm±2.5 nm) and a vertex angle α which is about 8°±1°.

The resulting image is then used to determine tip width and can be used to define the shape of the lower tip section (i.e., the active region of the probe tip). We discuss the ISNE in further detail below in the section of description of the preferred embodiments entitled "Improved Tip Width Correction" in the context of computing the tip width of, for example, a CD or "boot shaped" probe tip. Calibration structures with lateral protuberances can also be used to further define re-entrant features on the probe itself, such as the undercut region of the CD probe tip. One such structure with lateral protuberances is the "flared silicon ridge" (FSR) which may take on the form of an FSR line (FIG. 3B) or an FSR trench. Yet another alternative for the ISNE is a vertical parallel structure (VPS) which may be used to determine the width of the tip. Typically, using the VPS (FIG. 3C), maximum repeatability in tip width measurement is achieved. The structure can be used for periodic checks while in production to verify the tip width value and the vertical calibration (Z piezo scale factor) of the SPM.

Rather than using calibration structures, a scanning electron microscope (SEM) may be utilized to image the probe to define the geometry of the probe. However, when imaging down to the nano and angstrom scales, SEM resolution is compromised and may be unsuitable for the applications contemplated by the present invention. In still another alternative, the nominal dimensions of the probe tip that are provided by the probe manufacturer may be used to characterize the tip shape in Step 82. The characterization of the tip shape for correction vectors may be based on discrete points or use of equations, for example, polynomial or trigonometric equations that can be applied to correct the dilated image.

Figure 16:
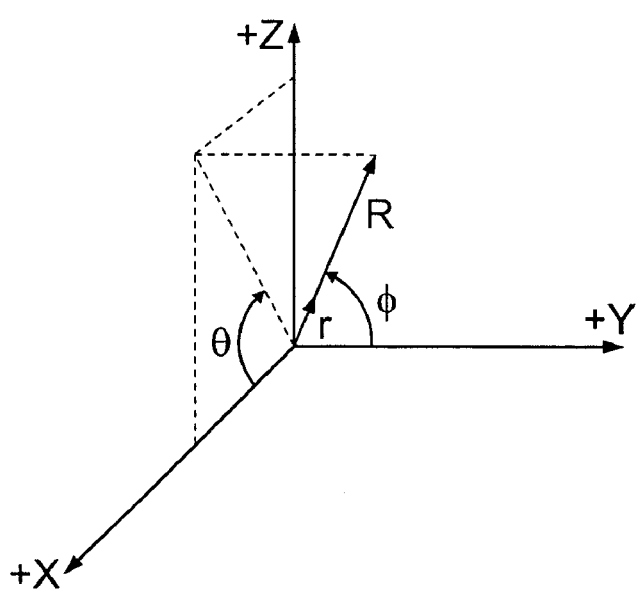
FIG. 16 is an orthogonal coordinate system illustrating the angles associated with the dimensional correction vector, according to the preferred embodiment.

Independent of the particular implementation of the characterization Step 82, the next step, Step 84, is to determine surface normals associated with several points on the active region of the surface of the probe. These surface normals extend orthogonally outwardly from the surface of the probe tip. Preferably, the surface normals are compiled as corresponding to particular angles θ (FIG. 6) in X-Z space to identify the characterized points or regions of the tip surface. For three dimensional X-Y-Z space, as shown in FIG. 16, θ and a second angle, φ, are used to define the surface normals, where r is 0 to ∞, θ is 0 to 360°, and φ is 0 to 180°.

After the tip shape is characterized, appropriate correction factors are determined for each point or region of the active portion of the probe tip in Step 86. These correction factors are computed relative to a reference point of the probe tip, i.e., the point of the tip used to plot the image data acquired by the AFM. These correction factors may be a convenient ΔX and ΔZ (see FIG. 6) (or ΔX, ΔY, ΔZ in X-Y-Z space) of a correction vector, or more complex equations associated with the characterized point or region. The correction vectors are then compiled, together with their associated surface normals, and stored for ready access and application during image reconstruction. For example, the array of surface normals may be stored in a look-up table along with the corresponding correction vectors for ready access during image reconstruction.

Then, in Step 88, a scan of a selected sample with a scanning probe microscope, such as an AFM, is begun. Note that each of the previous steps 82–86 are probe specific and are preliminary to the primary function of the preferred embodiment which is to reconstruct dilated surface data. In Step 90, method 80 optionally acquires an image profile of the sample surface as the scan is conducted. Of course, this is the dilated data obtained by the AFM, i.e., the uncorrected data.

A "smoothing" step (discussed later) may be implemented between steps 90 and 92 of the preferred embodiment (See FIG. 7) to provide a "cleaner" profile and thus facilitate the computations of the remaining steps, including determining slope and curvature.

Figure 8:
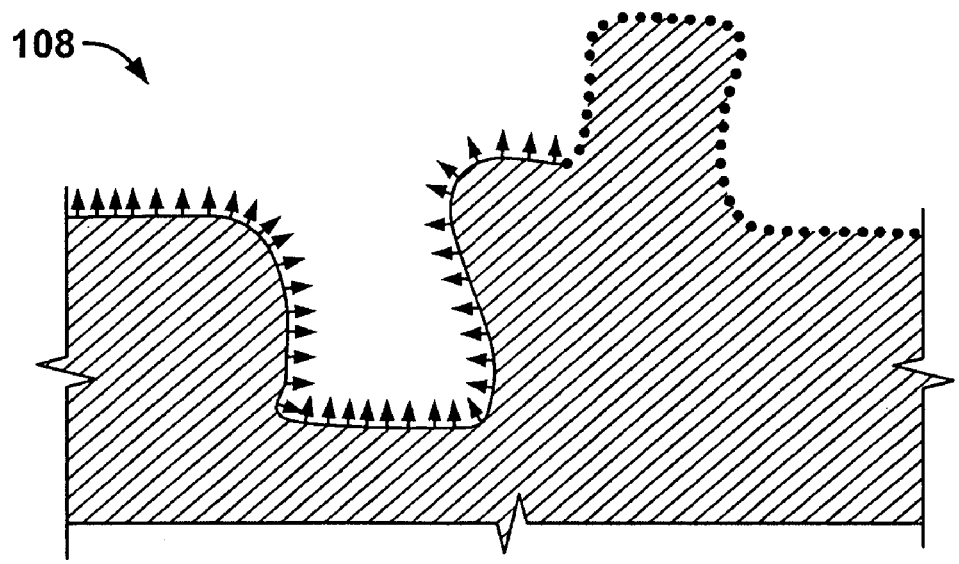
FIG. 8 is a side elevational schematic view of an image profile illustrating that unit surface normals associated with the sample are directed away from the interior of the sample.

Next, method 80 computes the slope and slope direction of the image profile for a region (e.g., associated with a point) along the profile using at least two points of the acquired raw data in Step 92. This slope may be measured relative to the scan direction (X axis) as ΔZ/ΔX when correcting two-dimensional data. Similarly, for three-dimensional data, the slope of the tangential plane described previously may be measured relative to the XY plane. In Step 94, method 80 determines the unit normal (77 in FIG. 6) to the sample surface for that point based on the slope and the direction of scanning. Notably, with respect to the direction of scanning, the sample unit surface normal is directed away from the "interior of the sample," for example, to the left when scanning and processing the image profile from left to right. Sample unit surface normals are illustrated in FIG. 8 for several of the evenly spaced data points of an AFM profile 108 and testing with the preferred median filter (discussed later).

Thereafter, in Step 96, method 80, via an angle θ in a look-up table for example (2-dimensional; θ and φ (FIG. 16) for a 3-dimensional table), compares the unit normal associated with the dilated data (Step 94) to the stored surface normals associated with tip characterization. In Step 98, method 80 determines an appropriate correction factor associated with the unit normal for that point. Again, this determination is made based on the characterization of the tip shape (Step 82).

Knowing the appropriate correction factor (e.g., vector) for the current point of the image profile, method 80 plots a point of a corrected image profile (i.e., reconstructed image) in Step 100. Then, method 80 asks whether all points in the dilated image profile have been considered in Step 102. If not, Steps 92–100 are repeated for at least several points in the image profile to build the corrected image profile, i.e., the profile that more closely resembles the actual sample surface. In Step 104, method 80 terminates when all points in the profile have been considered. Alternatively, correction vectors may be determined for several points of the image profile and then the points may be assembled into a corrected image profile for presentation to the user. Notably, as described in further detail below, in the case of tips that have non-unique surface normals, more than one correction factor may be applied to a point in the dilated data.

Notably, method 80 is not limited to the use of surface normals (Steps 94 and 96) for identification of an appropriate correction factor (vector) based on slope. For instance, the slope of the image data may be used directly with the knowledge that the left side of the probe makes contact while z is descending in a left to right processing of the data points and the right hand side of the probe is active when z is ascending. This logic is reversed when processing the sequence of data points from right to left.

The above-described algorithm is particularly suited for correcting SPM data when imaging with tips having shapes with surfaces that have unique surface normals (i.e., where the normal at each point along the contact or active surface of the tip defines a particular or unique angle with respect to a selected reference), such as the conventional parabolic AFM tip shown in FIG. 1. However, when imaging with tips that have more complex shapes that may have multiple surfaces described by the same (non-unique) surface normal, the point of contact is more difficult to determine. Therefore, to accommodate tip shapes such as that shown in FIG. 2, for example, the inventor has developed modifications to algorithm 80.

Figure 9:
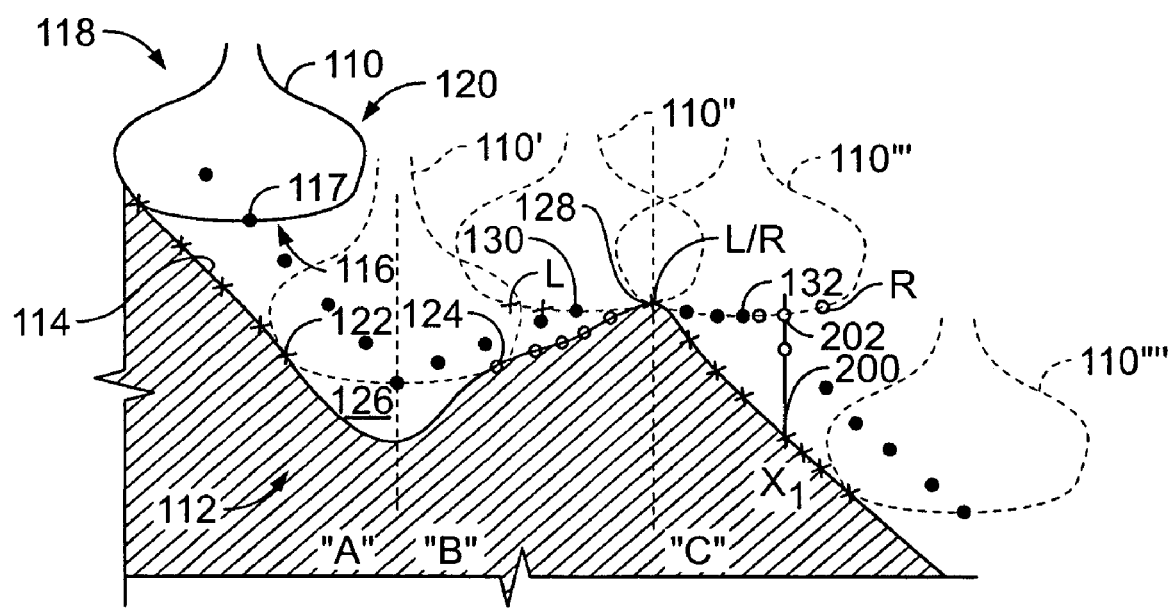
FIG. 9 is a side elevational schematic view of a dilated image profile using a tip having non-unique surface normals, illustrating reconstructed points determined according to the preferred embodiment.

One example of correcting dilated two-dimensional SPM data when using a probe tip 110 having non-unique surface normals is illustrated in FIG. 9. The surface normals are non-unique because, for instance, all surface points along the bottom surface of tip 110 between active probe tip points labeled "L" and "R" have the same surface normals extending orthogonally downwardly from the flat bottom.

In this example, tip 110 having a left side 118 and a right side 120 is shown being scanned over a surface 114 of a sample 112 from left to right. The series of dots, •, represent the dilated "raw" data acquired by the AFM using the center point 117 of a distal end 116 of the tip as a reference. A dilated image results.

For the dilated image data corresponding to the regions of the sample marked "A," "B" and "C," the dilated image data is corrected differently. Using the algorithm described previously, for at least several points in the dilated image represented by the series of dots in the region of the sample surface marked "A," the preferred embodiment will correctly determine the point of tip contact on the sample surface 114 (computing slope and determining the unit surface normal) with method 80, and thus is able to correct the dilated image data by applying an appropriate correction factor to that point in the dilated image. Again, the appropriate correction vector is the correction vector corresponding to the surface normal at the determined point of tip contact. Notably, for region "A," the point of tip contact is clearly on the left hand side of CD tip 110.

At the interface between region "A" and region "B," there is an abrupt change in the slope of the dilated data. As discussed in further detail below, there are several potential causes for this. In this case, it is two-point contact between the tip and the sample surface at points 122 and 124, as shown in FIG. 9. In other words, the width of tip 110 is too broad to contact the "valley" region 126 at the interface between region "A" and region "B." As a result, without further enhancement of the reconstructed image (described below, FIG. 12), the shape of the valley region of sample surface at the A–B interface is "shaded."

Notably, at this interface point, tip-sample contact transitions from left side 118 of tip 110 to right side 120 of tip 110. Therefore correction vectors switch from being directed to the left in region "A" to being directed towards the right in region "B." This is represented symbolically in FIG. 9 where the circles represent the corrected data points obtained from active probe points on the right side 120 of tip 110, while the cross ("X") marks represent the corrected data points obtained from active probe points on the left side 118 of tip 110.

Continuing from left to right, at the interface between the regions marked "B" and "C," a peak 128 in the sample surface 114 is present. When tip traverses peak 128, the first dilated data point is at about 130, where probe surface point "R" contacts peak 128. As the scan continues (left-to-right), tip 110 makes contact with peak 128 at several points on the surface of tip between "L" and "R," each having the same downwardly extending orthogonal surface normal. This is reflected in the dilated data (again, dots) between points 130 and 132 moving left to right. This flat portion of the dilated image between points 130 and 132 extends horizontally for a distance approximately equal to the distance between "L" and "R" for relatively sharp vertical protuberance in the sample 114.

Because each of these image points has the same unit surface normal (extending orthogonally upwardly, i.e., corresponding to a tangent that has a local slope tangent that has a zero slope, the stored "point of tip contact" data relating to that surface normal will not accurately identify the actual point of contact as it moves between points "L" and "R." As a result, method 80 will not supply a proper correction factor to reconstruct the surface, and will instead generate an image artifact. The present design has taken this into account with an alternate method.

Figure 10:
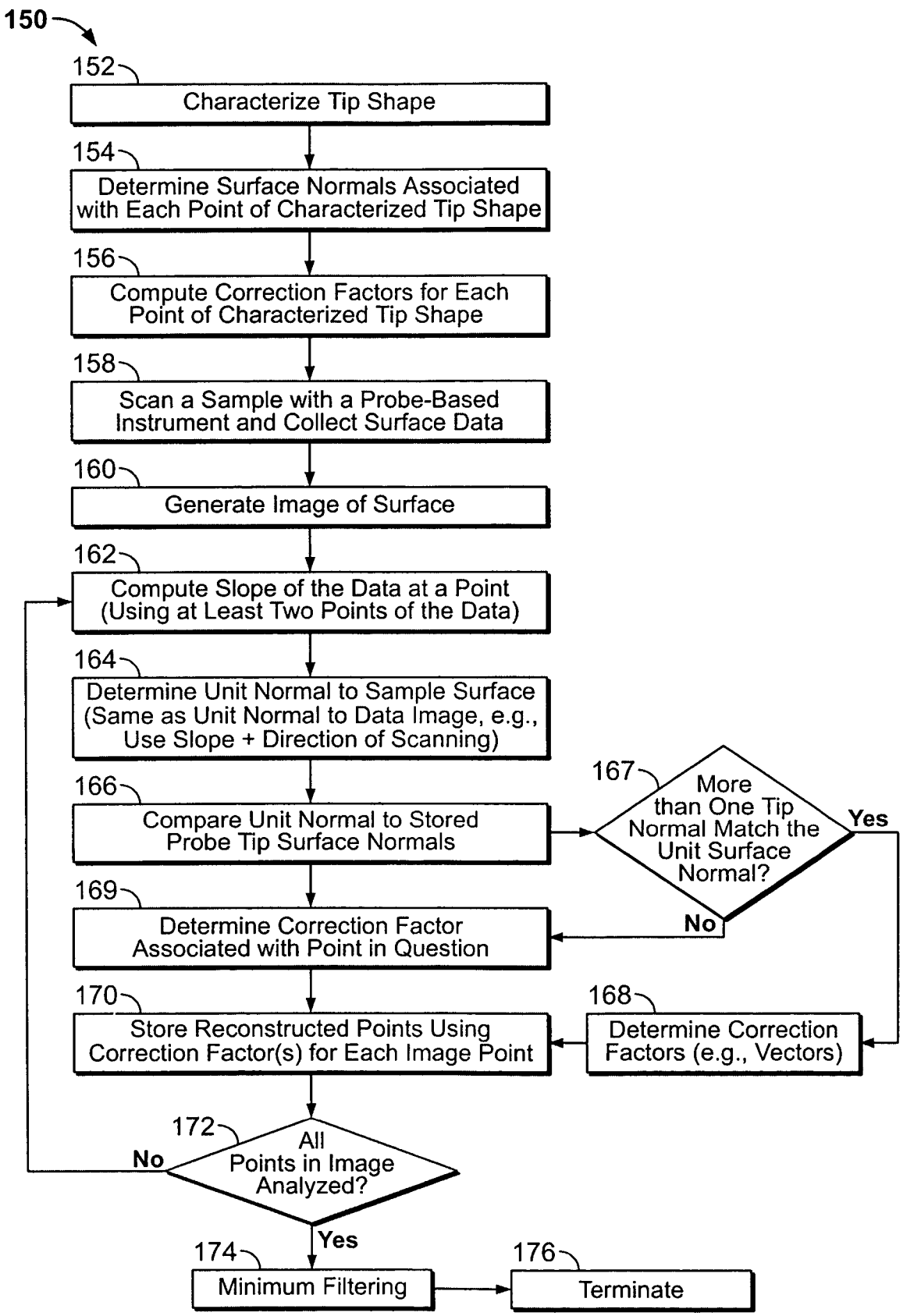
FIG. 10 is a flow diagram illustrating an alternate method of determining correction vectors when employing a tip having non-unique surface normals, such as that shown in FIG. 2.

A method 150 according to this alternate preferred embodiment is illustrated graphically in FIG. 9 and described in conjunction with the flow diagram of FIG. 10. Initially, in Step 152, the shape of the tip employed is characterized using any one of the number of techniques described previously. Examples of possible techniques to characterize tip shapes are described above in conjunction with FIG. 7 (Steps 82 of method 80). After the shape of tip 110 is characterized, surface normals are determined in Step 154 and corresponding correction vectors are computed in Step 156, a scan of a selected sample with the AFM is conducted in Step 158, as shown and described above in conjunction with FIG. 7. Then, in Step 160, the method generates an image profile of the sample surface. What results is raw or "dilated" data which requires correction. Next, as in method of FIG. 7, the method computes the slope and associated slope direction of the image profile for a first point of the profile using at least two points of the dilated data in Step 162. Notably, the slope is measured relative to the X axis ($\Delta Z/\Delta X$ for the case of correcting two-dimensional data). Again, as noted previously, for three-dimensional data, the slope of tangential plane is measured relative to the X-Y plane.

Thereafter, the method 150 determines the unit surface normal of the sample at the image point being processed in Step 164, similar to method 80. In the next step, Step 166, a comparison of the unit surface normal is made with the compiled data corresponding to the surface normals of the tip (characterized in Step 152). In the case between data points 130 and 132 in FIG. 9, the unit surface normals of the dilated image data in this region all have infinite slope (i.e., extend orthogonally upwardly). These unit surface normals could correspond to any one of the surface normals associated with the points on the flat bottom portion of distal end 116 of probe tip 110 (between points "L" and "R") as each has infinite slope (although in an opposite direction, i.e., extending orthogonally downwardly). Again, because tip 110 has surface points that define non-unique surface normals, method 80 does not provide an appropriate correction factor for the dilated data continuously spanning the border between "B" and "C" regions shown in FIG. 9.

In this case, the preferred solution is to first determine whether the unit surface normal associated with the dilated data corresponds to a unique surface normal associated with the probe tip (Step 167). If not, in Step 168, two (or more) correction vectors are determined, one for each of two designated active points on the flat region of tip 110. In this case, preferably the end points of the flat region of the probe, i.e., points "L" and "R" shown in FIG. 9. These two correction factors are then applied to the data point in question in Step 170 and plotted in the generation of a preliminary reconstructed image. In other words, two (or more) reconstructed points are plotted for such data points. However, in the case that the point in the image profile defines a surface normal that is unique to a single point on the sample surface, the method 150 (like method 80) generates an appropriate correction vector in Step 169 prior to plotting (and/or storing) the corrected data point in Step 170.

Next, in Step 172, method 150 determines whether all points in the selected section of the image profile have been analyzed and an appropriate correction vector (or vectors) applied. If not, Steps 162–170 are repeated for additional points of the profile. Then, in Step 174, method 150 conducts a "minimum filtering" function to accurately reconstruct the surface of the sample based on the corrected data. Minimum filtering is employed because it is known that the correct reconstructed point will be the one with the lowest corresponding Z-value for any particular X position, as the sample is always below the tip. More particularly, method 150, in Step 176, analyzes each "X" position in the preliminary reconstructed image, and determines whether there is more than one data point associated with that "X" position, approximately, of the preliminary reconstructed image. If so, the method selects the corrected data point having the smallest vertical or "Z" value, and discards any other point associated with that "X" position.

For the preliminary reconstructed image shown in FIG. 9, where both crosses ("x") and circles ("o") corresponding to left hand and right hand reconstructed points, respectively, exist, the correct reconstructed point will always be a minimum of those correction points at any particular "X" position of the image to more accurately approximate the actual sample surface. As an example, looking at X position "$X_1$" along the slice in FIG. 9, a left hand reconstructed point 200 and a right hand reconstructed point 202 are plotted. In this case, left hand reconstructed point 200 is kept, while right hand reconstructed point 202 is discarded because point 200 has an associated Z value that is less than the right hand reconstructed point 202. In this fashion, a reconstructed image profile that more closely resembles the actual sample topography is generated.

It is important to note that the image data points that cause at least two reconstruction points to be determined in Step 168 are preferably highlighted in some fashion so the program understands that these points are candidates for the minimum filtering step. Otherwise, if a minimum Z-height filtering step were performed on a scan position of the reconstructed image having two points that, although having different Z heights, are legitimate and should comprise points in the final reconstructed image, the lesser of the two points in terms of Z height would be discarded. For example, this would be the case for reconstructed points 188 (corresponding to an undercut region) and 196 in FIG. 12 (described below), which have the same "X" or scan position but different Z heights, both legitimate.

Method 150 is not limited to the use of surface normals (Steps 164, 166 and 167) for identification of an appropriate correction factor (vector) based on slope. For instance, the slope of the image data may be used directly with the knowledge that the left side of the probe makes contact while z is descending in a left to right processing of the data points and right hand side of the probe is active when z is ascending. This logic is reversed when processing the sequence of data points from right to left.

Figure 11:
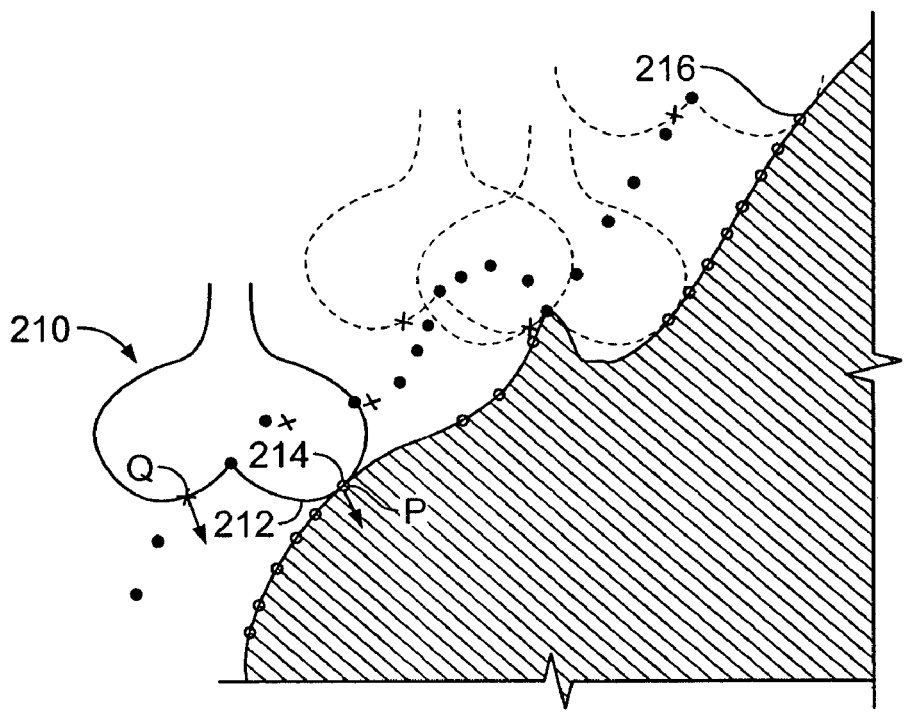
FIG. 11 is a side elevational schematic view providing another illustration of the method of FIG. 10 when employing a CD tip having a concave-shaped distal end.

Turning to FIG. 11, in another example of a probe having at least one non-unique surface normal, a CD probe tip 210 having a concave bottom surface 212 is utilized to scan a sample. Similar to the flat bottomed CD tip 110 that includes non-unique surface normals, surface normals at points Q and P shown in FIG. 11 are non-unique. Again, when implementing the algorithm of the preferred embodiment, without further modification, method 80 (FIG. 7) is unable to unambiguously determine the point of contact on the CD tip when either Q or P contacts the sample surface (such as at 214 or 216 in FIG. 11). Fortunately, the algorithm described in conjunction with FIG. 10 can be utilized to determine the appropriate correction factor. All the appropriate correction factors are computed and plotted as a reconstructed image ("Xs" representing left side correction factors and "Os" representing right side correction factors), including generating two correction factors for dilated image points that have a unit surface normal that is equal and opposite to a surface normal associated with more than one point on the surface of the tip 210 in Step 168 (for ease of presentation, not all reconstruction points "X" and "O" are shown). Then, the minimum Z corrected point associated with each scan position of the reconstructed image is selected in Step 174 of method 150. Utilizing this minimum Z height filtering, an accurate reconstructed image can be obtained utilizing even such complex probe tip shapes as that shown in FIG. 11.

Figure 12:
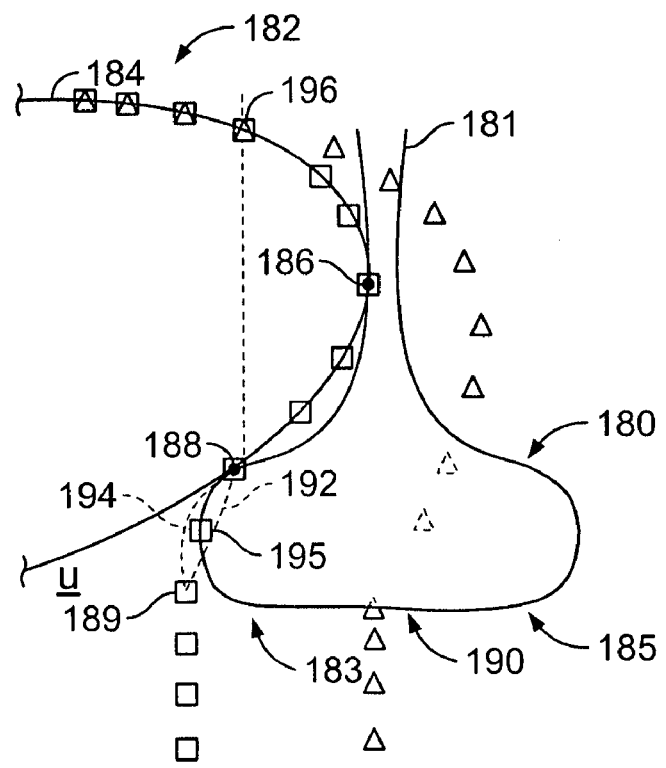
FIG. 12 is a side elevational view of a tip interfacing with a sample surface at two points.

Next, as mentioned previously in conjunction with FIG. 9 (border regions "A" and "B"), when imaging particular types of features on samples, often times more than one point of a tip 180 having, for example, left and right boot-shaped sections, 183 and 185, respectively, may contact the sample surface 184 at the same time, as shown in FIG. 12 at points 186 and 188. In the event that such two point contact occurs, the slope of the acquired data (series of triangles) typically will change abruptly (at about point 190 of the dilated data). In this case, as the scan continues (downwardly, left-to-right, at point 190), a shaft 181 of tip 180 continues to contact sample surface 184 at point 186, thus yielding the vertical data points shown. Notably, the corresponding reconstructed image (block-shaped points corresponding generally to the sample surface) also goes vertical starting at point 189. It is useful to identify any such occurrence of two-point contact in attempting to reconstruct the image of the sample surface from the dilated image data. By "flagging" such occurrences, the data can be further analyzed to determine whether additional portions of the tip can be removed from the image.

Notably, this abrupt change in slope ($2^{nd}$ derivative of Z with respect to X) that occurs at image data position 190 (FIG. 12) is an indicator of two (or more) point contact, and can only be created by this condition if measurement noise is not a factor, and the tip has not been damaged. This is due to the fact that the ideal (noiseless) image cannot measure any slope change greater than the maximum curvature of the probe tip. In general, assuming noise is negligible, the angle change at image data position 190 can serve as either a potential indicator of two (or more) point contact, or of probe damage that has resulted in a surface feature with sharp curvature.

To identify such instances of two-point contact, an additional method of the preferred embodiment may be implemented accordingly. This modification includes analyzing the history of the slopes determined as, for instance, in Step 92 of algorithm 80 (FIG. 7).

Figure 13:
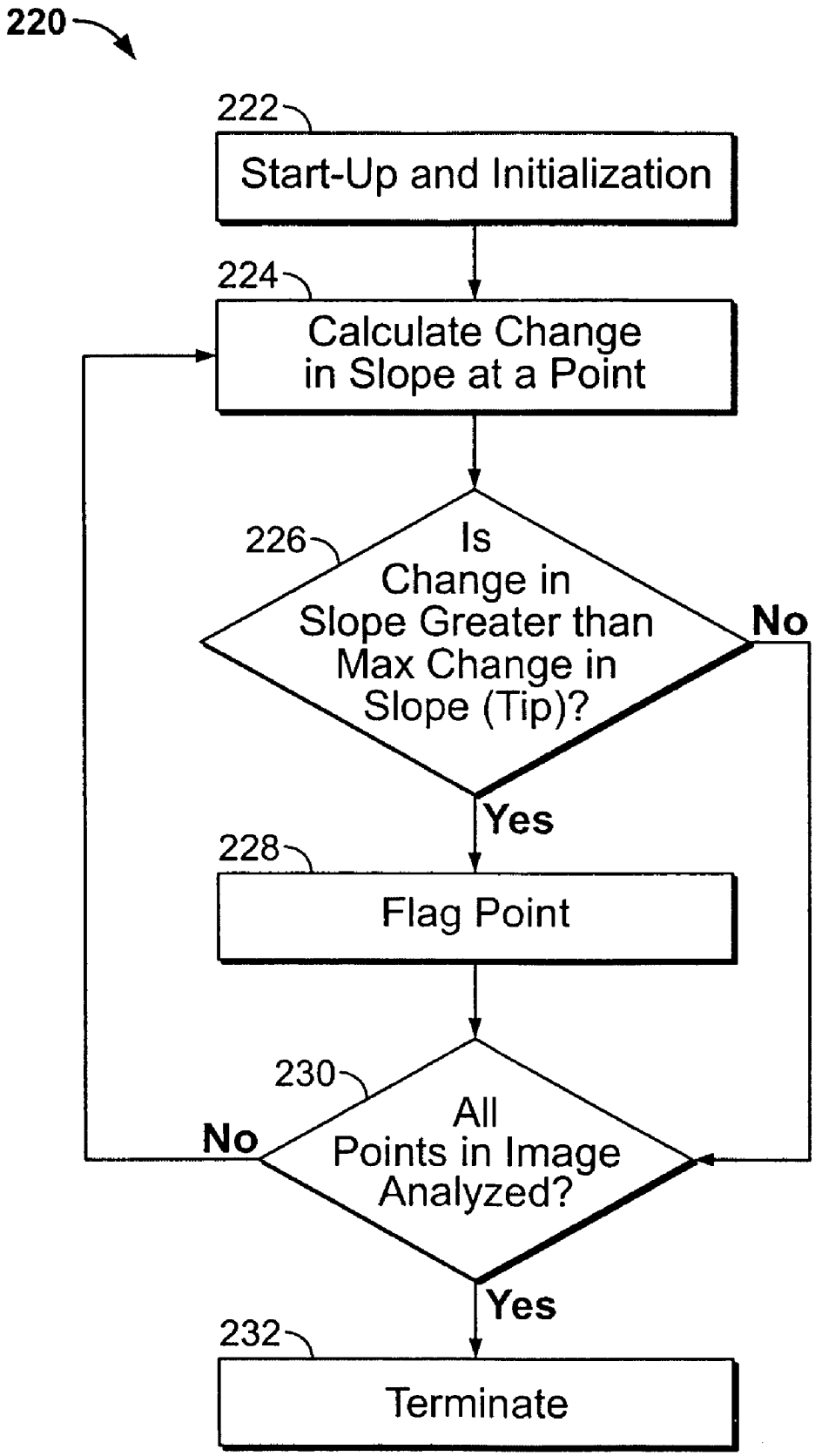
FIG. 13 is a flow diagram of a method according to the preferred embodiment, whereby two-point contact is identified.

Specifically, turning to FIG. 13, upon generating a reconstructed image according to either method 80 (FIG. 7) or 150 (FIG. 10), method 220 is employed to analyze the resulting data for two-point contact. After a start-up and initialization step, Step 222, the slopes associated with consecutive points in the reconstructed image are analyzed and a change in slope is or curvature (i.e., $\partial^2 z/\partial x^2$) computed in Step 224. The method then compares the change in slope with the maximum change in slope of the probe tip in Step 226. If the image point change in slope exceeds the maximum value, the point is flagged as an instance of possible two-point contact in Step 228. In Step 230, method 220 determines whether additional points need to be considered. If so, Steps 224–230 are repeated until no points remain. Of course, the algorithm is flexible in that not all data points need to be considered to generate a reconstructed image. The method then terminates in Step 232.

One way to determine whether there has been an abrupt change in slope (Step 226) is to determine whether the change in the slope (i.e., curvature) is greater than the maximum change in slope along the surface of the probe tip. The maximum change in slope along the surface of the probe tip can be determined upon characterizing the tip, for example, in Step 82 of method 80. In FIG. 12, at point 190 the unit surface normal transitions from approximately 315° relative to the scan or X direction to about 0° relative to the scan direction. Again, this is likely caused due to shaft 181 and boot-shaped section 183 of CD tip 180 contacting the sample surface at the same time. As the left-to-right scan continues in FIG. 12, the shaft continues to interact with the sidewall at about point 186, and thus the dilated data obtained goes essentially vertical, as one would expect when the vertical shaft is contacting the sample sidewall. In this case, the preferred embodiment may compute two correction factors to correct the dilated image point 190 to two reconstructed points, 188 (the correct reconstructed point), as well as point 195, the point (similar to left side of shaft 181, not characterized) which has a surface normal that is equal to and opposite the unit surface normal for vertical image data (i.e., the unit surface normal extending in the positive scan direction).

In the preferred embodiment, points 188 and 189 in FIG. 12 are connected by a straight line to produce the corrected image profile of the sample surface. However, using an enhancement technique, an image of more of the undercut region of the sample can be obtained. In particular, between points 188 and 189 illustrated in FIG. 12, it is known that the arcuate shape of the CD probe tip could have not contacted the undercut region between these points, and therefore one can provide a better approximation of that section of the undercut region by extracting the shape (2-D) or volume (3-D) of the probe between these two known points on the surface of the probe tip. For instance, the shape of tip 180 between points 188 and the point furthest to the left of the left side 183 of tip 180 could be extracted between points 188 and 189 of the reconstructed image to produce reconstructed surface 194 shown in phantom.

Improved Tip Width Correction

Figure 3A:
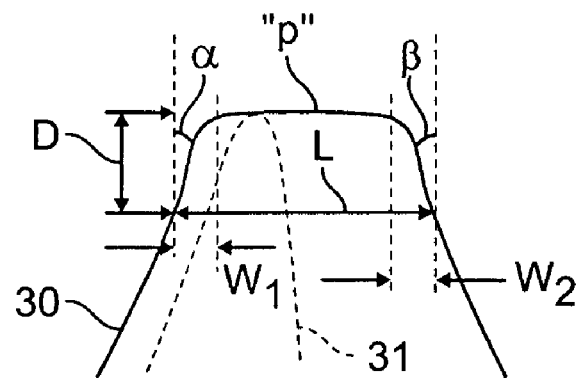
FIGS. 3A–3C illustrate calibration structures used to characterize a tip of a probe-based instrument, FIG. 3A including a plot of an AFM scan of a silicon nanoedge.
Figure 3B:
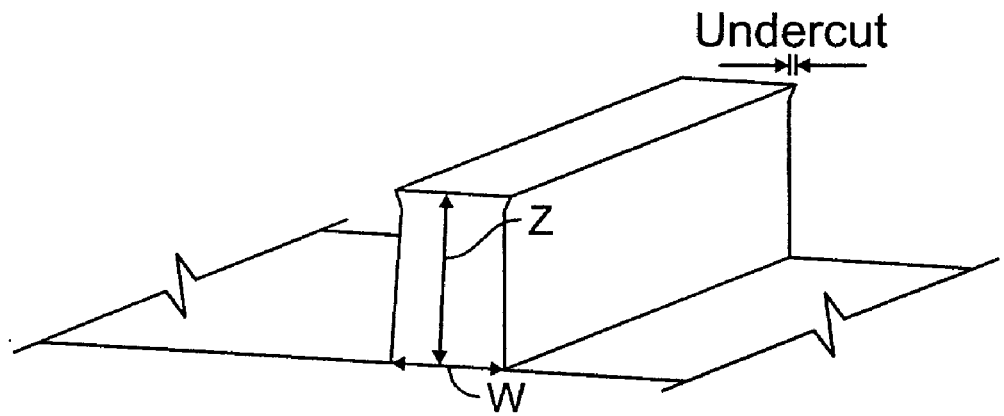
Figure 3C:
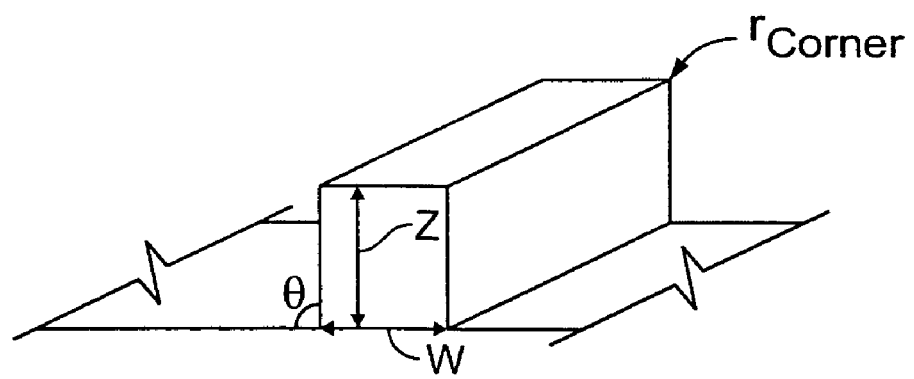
Figure 14:
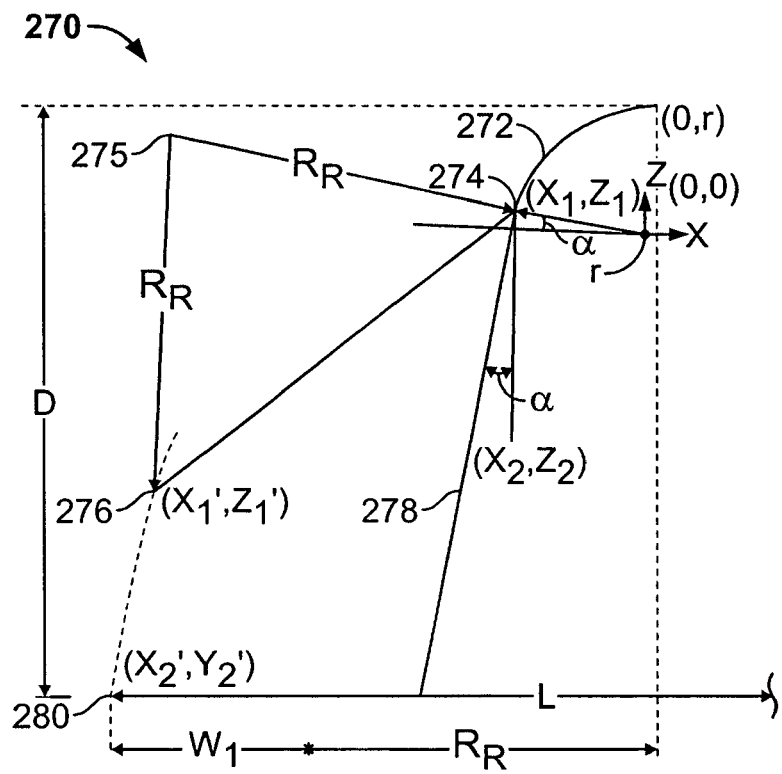
FIG. 14 is a side elevational schematic view illustrating an improved method of computing tip width.
Figure 14A:
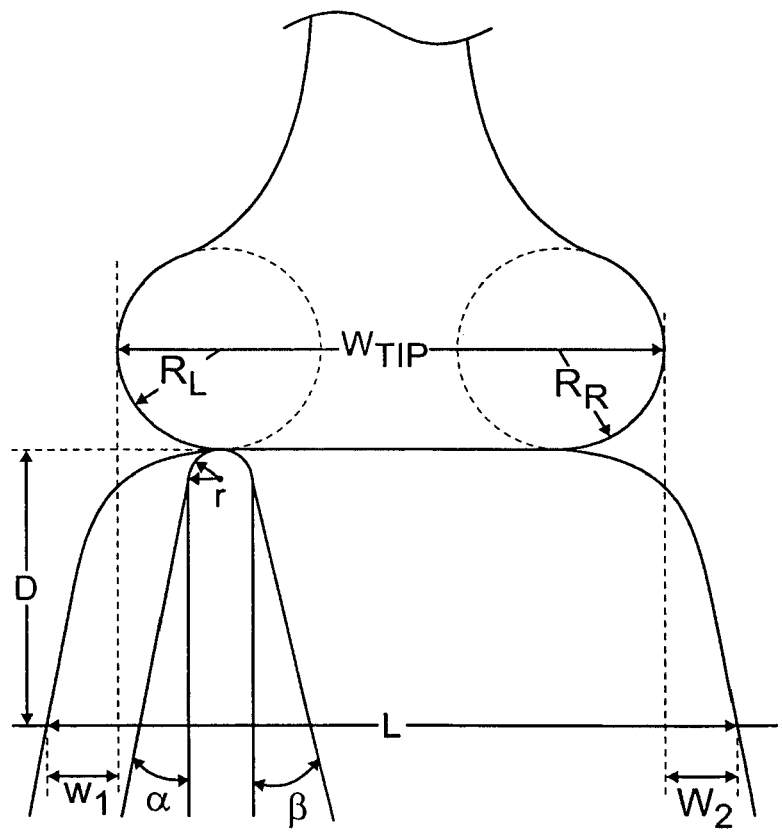
FIG. 14a is a side elevational schematic view similar to FIG. 3C, illustrating the geometry of the exact tip width equation of the preferred embodiment.

Turning to FIGS. 14 and 14a, which are similar to the silicon nanoedge and its profile shown in FIG. 3A, an improved silicon nanoedge (ISNE) is shown to illustrate how Equations 2 and 3 presented above have been improved to more accurately define the tip width of, for example, a CD tip. Again, Equations 2 and 3 presented previously are only accurate when the angles (alpha or beta) are essentially zero degrees. Again, because even the improved silicon nanoedge does not have perfectly vertical sidewalls, this assumption introduces error into the characterization of the tip width. An "exact" equation for the end corrections ($W_1$ and $W_2$ which are computed according to Equations 2 and 3 discussed previously) is presented below. However, an improved version of Equations 2 and 3 is first described.

In FIG. 14, the end corrections $W_1$ and $W_2$ can be computed with greater accuracy by accounting for the specification end radii, $R_R$ and $R_L$ associated with the tip in the computation. The specification and radii $R_R$ and $R_L$ are known, as they are provided by the manufacturer and/or are estimated by FSR characterizer data mentioned previously.

Rather than simply multiplying the tangent of the left and right side slope angles by the height "D" minus the radius of the ISNE (as done previously), in this embodiment the specification end radius radii is also subtracted from the height "D" to improve accuracy of the tip width computation. The new Equations for $W_1$ and $W_2$ are defined as follows, $$W_1 = (D - r - R_R) \tan \alpha + r \qquad \text{Equation 4}$$

$$W_2 = (D - r - R_L) \tan \beta + r \qquad \text{Equation 5}$$

Although providing an improvement over the prior art tip-width equations 2 and 3, an "exact" equation has been developed. Again, the prior art method described previously underestimates tip width for alpha greater than zero degrees, and thus underestimates CD feature size for a trench, or via, and overestimates CD feature side for a line, ridge, or contact, for example.

Similar to previous embodiments and the prior art, Equation 1 is utilized to determine the width of the tip with image and correction features ($W_1$, $W_2$), but the method of the preferred embodiment accounts for characteristics of ISNE that were heretofore not considered using an ISNE and CD and radii convolution set-up 270 shown in FIG. 14. In particular, when employing a CD tip having a known CD tip radius, Equations 2 and 3 (or alternatively, Equations 4 and 5), become, $$W_1 = ABS|-\cos(\alpha)(r+R_R)-\tan(\alpha)(D-r-R_R+\sin(\alpha)(r+R_R))+R_R| \qquad \text{Equation 6}$$

$$W_2 = \cos(\beta)(r+R_L)-\tan(\beta)(D-r-R_L+\sin(\beta)(R+R_L))-R_L \qquad \text{Equation 7}$$

Note that for the case of a vertical sidewall (i.e., $\alpha=0$ or $\beta=0$), equations 6 and 7 degenerate to $W_1=r$ and $W_2=r$, respectively.

More particularly, with reference to FIG. 14 illustrating the geometry of the above equation as a CD tip (not shown) is scanned over an ISNE 272, a first tip contact point 274

($x_1$, $z_1$), at the tangency point between the sidewall and vertex radius, is defined as follows:

$$x_1 = -r \cos\alpha \qquad \text{Equation 8}$$

and $$z_1 = r \sin\alpha \qquad \text{Equation 9}$$

The point 276 ($x_1'$, $z_1'$), which is the position at the base of tip (e.g., "R" in FIG. 9) when at contact point 274, is defined as $$x_1' = \cos\alpha(r + R_R), \qquad \text{Equation 10}$$

and $$z_1' = -R_R + \sin\alpha(r + R_R) \qquad \text{Equation 11}$$

Using equations 10 and 11 and solving for $x_2'$, the "X" position at the base of tip when the contact point is at a second position 278, $W_1$ (FIG. 3A) can be solved for the right radius of the CD tip, $R_R$. $W_2$ is solved the same way for the left side radius, $R_L$.

Figure 15:
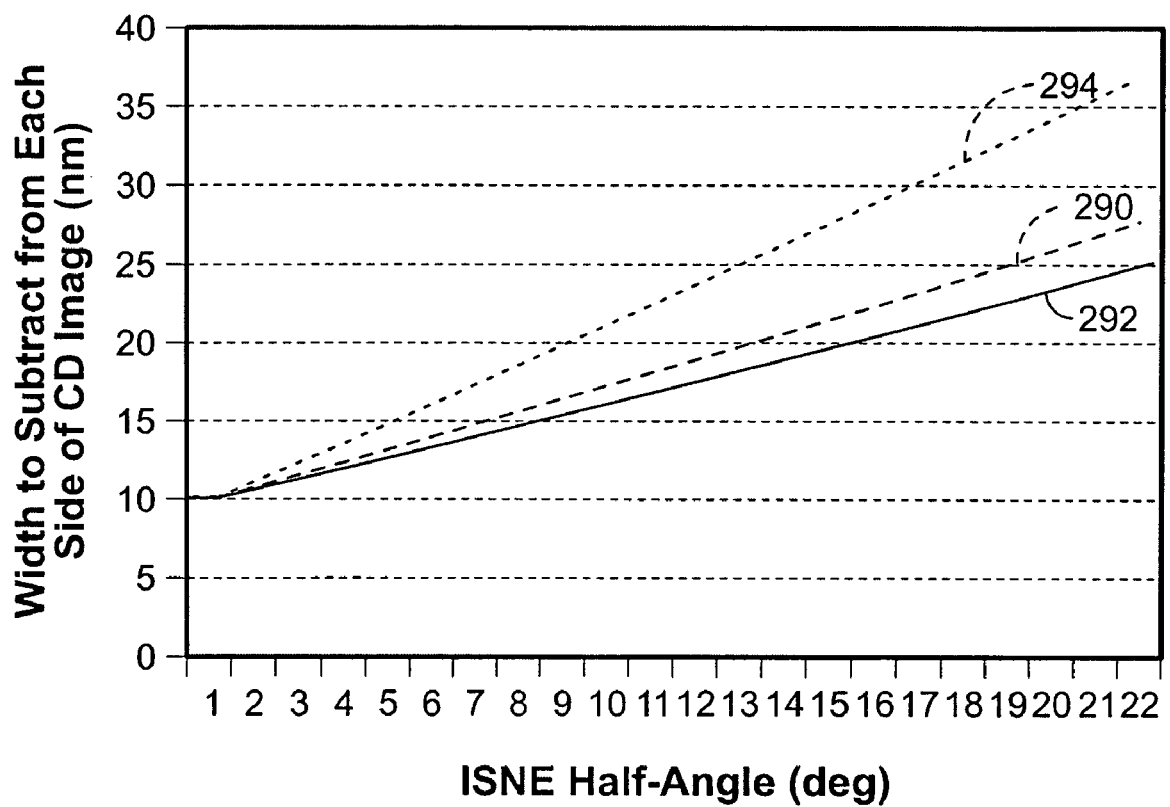
FIG. 15 is a graph illustrating a comparison of the exact equation, the improved equation and the prior art equation for performing tip width correction.

To reiterate, the dimension "L" is the width of the image at the Z distance "D" from the plateau of the scanned image, while tip width ($W_{tip}$) equals L−($W_1$+$W_2$). And, $R_L$ and $R_R$ are the radii of the left and right sides of the CD tip (measured from the appropriate tip center point, point 275 for right side), respectively, and r is the radius of ISNE 272. The exact equation for the tip-width (Equation 1 with end corrections computed as in Equations 6 and 7) yields significantly greater accuracy when performing tip-width correction analysis on dilated AFM data, as shown in FIG. 15 which provides a graphical comparison of the exact equation (plot 290), the improved equation (plot 292), and the prior art equation (plot 294). In this case, the ISNE radius is 10 nm, the $R_L$ and $R_R$ end radii are 30 nm, and the vertical height (D) for measurement is 80 nm. As shown, the prior art equation overestimates the tip-width to be subtracted for angles greater than 0°, and does so to a greater extent than the improved equation underestimates the tip width.

The scope of the present invention is not limited to the geometry of the ISNE (or SNE) structure. For example, characterization of the CD tip width could use the sample convolution of the tip radii, characterizer radius (or radii) and sidewall angles in the use of a line or contact, or the upper corners of a trench or via.

In the case of a line, the line may be viewed as an ISNE with an additional horizontal section which expands the ISNE at the vertex to a horizontal plateau. The width of the line can be either measured or provided in standard specifications. The two upper corners of the line may either have the same or different radii. Similarly, the same relationships apply to the trench, and the three dimensional analogs of the line and trench (namely, the contact and via, respectively).

Smoothing

Figure 17:
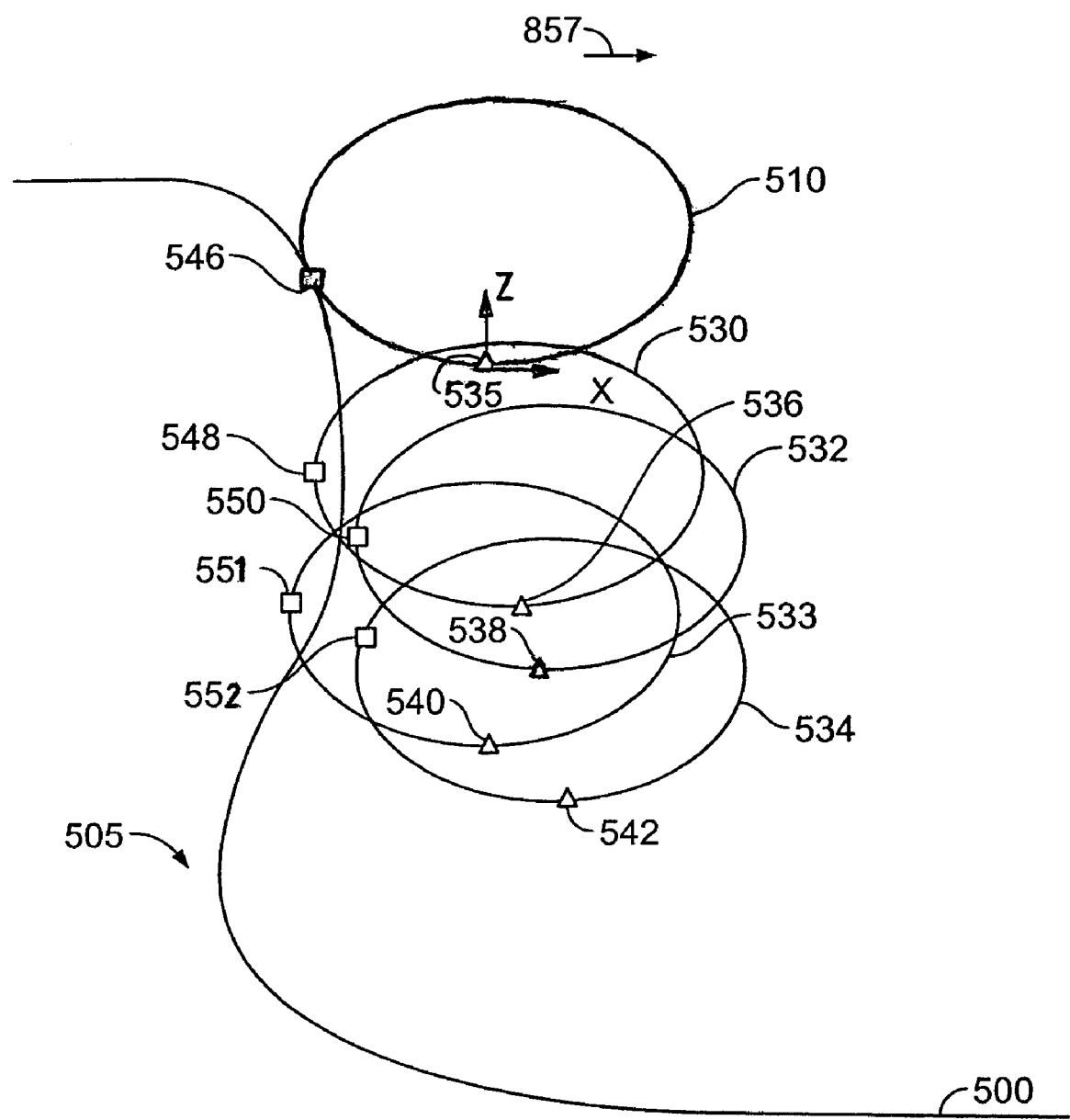
FIG. 17 is a schematic diagram of a reconstructed surface topology superimposed with noise artifacts illustrating employing a smoothing step in accordance with a preferred embodiment.

The smoothing step noted above is particularly effective in reconstructing sample surface topologies having a re-entrant region. FIG. 17 illustrates a sample surface 500 having a re-entrant or undercut region 505.

Referring to FIG. 17, a series of idealized probe profiles 510, 530, 532, 533 and 534 are shown, each representing "a translate" of the scanning probe tip. A translate is an actual or representative profile of the probe tip at a location of acquired data and in a direction of left to right scanning of the sample surface 500. The idealized probe tip traverses the sample surface 500 as indicated by the triangular symbols.

Each triangular symbol depicts a base 535, 536, 538, 540, and 542 of the translated probe profiles 510, 530, 532, 533, and 534 located at a X-Z reference along the left to right direction of scanning. The reconstructed image points of the sample surface topology are shown as square symbols. The square symbols correspond to reconstructed image points 546, 548, 550, 551, and 552 associated with the translated idealized probe profiles 510, 530, 532, 533, and 534.

Reference to "idealized" probe profiles can be actual profiles of the scanning probe tip and is not limiting on the invention.

Certain acquired image data represented by the triangular symbols 536, 538, and 540, and 542 are superimposed with noise artifacts. FIG. 17 illustrates how the superimposed noise can result in erroneous reconstruction of image points 548, 550, and 551, and 552, respectively, relative to the sample surface 500. The noise artifacts can be associated with actual fluctuations of the probe coordinate system and/or by instrument noise along the direction of scanning, thus resulting in inconsistent probe and sample surface measurements. The method of image reconstruction can employ the slope-method described previously, or the alternate methods of image reconstruction discussed immediately below.

Geometric Shape Filter

Figure 19:
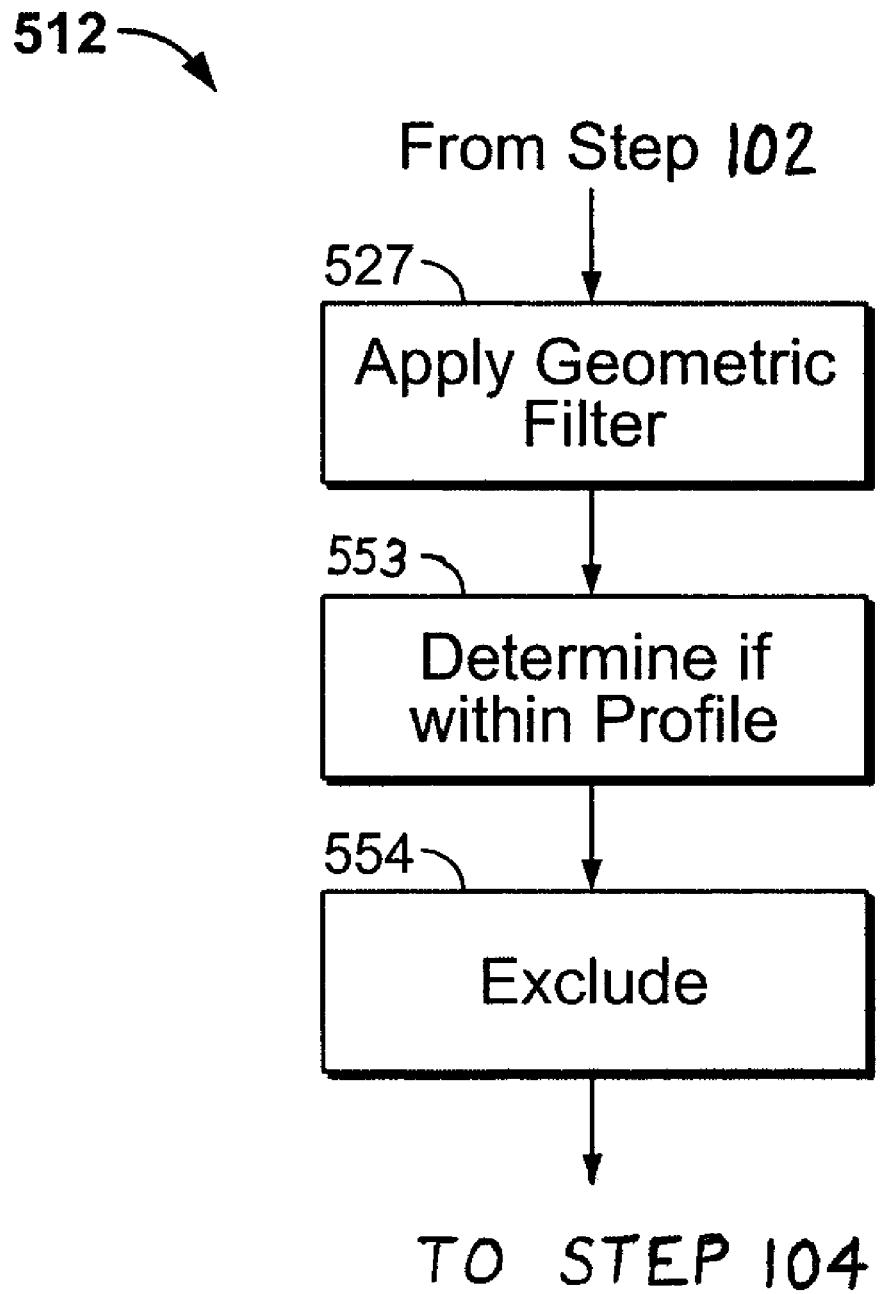
FIG. 19 is a flow diagram of one embodiment of applying a geometric shape filter.

FIG. 19 illustrates one embodiment of a smoothing step 512 to reduce the noise artifacts depicted in the reconstructed image points 548, 550, 551, and 552. Referring to FIGS. 17 and 19, step 527 includes applying a geometric shape filter to remove or exclude the noise artifacts in the reconstructed image data. The preferred step 512 is performed between steps 102 and 104 of method 80 illustrated FIG. 7. In contrast, a known geometric filter of the prior art is configured to be applied between steps 90 and 92 of method 80 (FIG. 7).

The step 527 of applying the geometric shape filter generally includes superimposing or mapping the translated idealized probe profiles 510, 530, 532, 533, and 534 at the location of the acquired data. The translated idealized probe profiles 510, 530, 532, 533, and 534 correspond to the acquired original acquired image points with co-location of the probe base 535, 536, 538, 540, and 542 and reconstructed image points 546, 548, 550, 551 and 552.

Referring to FIGS. 17 and 19, step 553 includes determining whether the reconstructed points 546, 548, 550, 551 and 552 fall within other idealized probe profiles 510, 530, 532, 533 and 534. In general, a reconstructed image point falls within another idealized probe profile if it is determined or calculated to be located within the region defined by the limits of the geometric shape(s) (discussed below) that are representative of the scanning probe at "other" locations of acquiring or measuring the sample surface 500, as illustrated with the below example. Step 554 includes excluding reconstructed image points (e.g., reconstructed image points 550 and 552) that fall within geometric limits representative of other idealized probe profiles 510, 530, 532, 533 and 534. For example, FIG. 17 illustrates that reconstructed image point 550 would be excluded because it is located within the geometric limits of idealized probe profiles 530 and 533. In another example, reconstructed image point 552 would be excluded because it is located within the geometric limits of idealized probe profile 533. In this way, the smoothing step 512 enhances the reconstructed image, reduces the problem of noise amplification and artifact generation, and eliminates noise induced artifacts without eliminating crucial sharp features of the image surface. Moreover, the smoothing step 512 allows use of the robust slope-based reconstruction techniques described herein.

Figure 18:
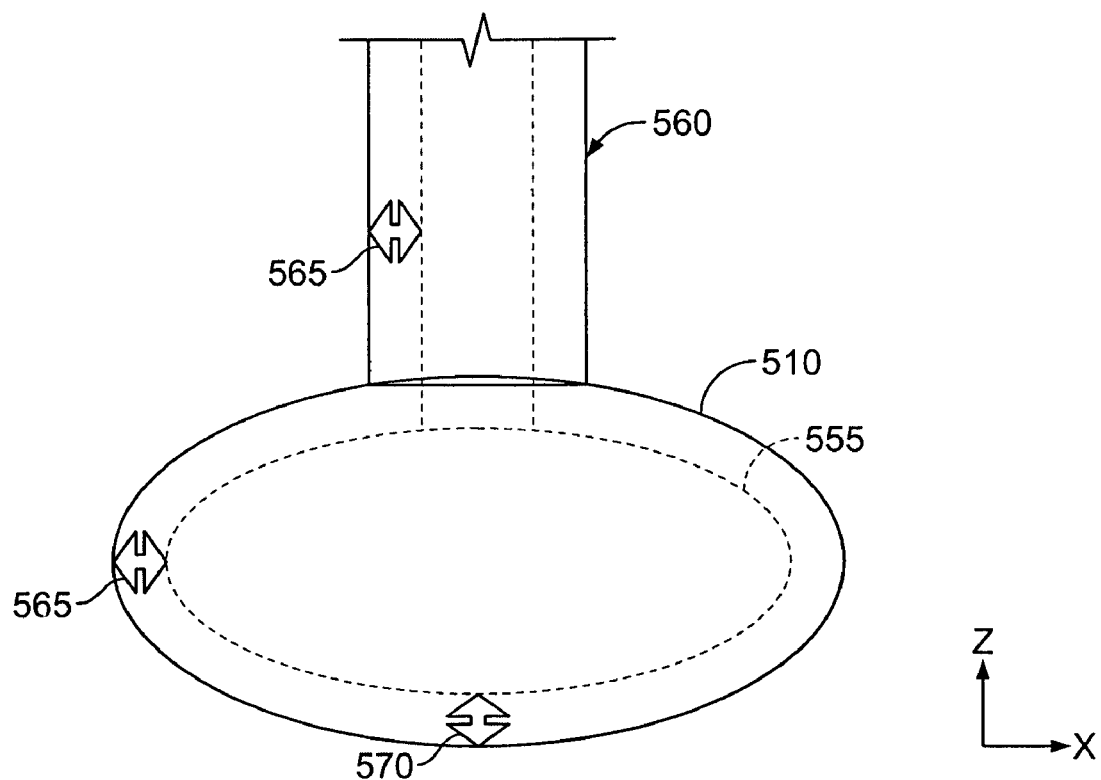
FIG. 18 is a schematic diagram of an idealized probe profile employed as a geometric filter used in a smoothing step of a preferred embodiment.

FIG. 18 illustrates a preferred embodiment of the idealized probe profile 510 utilized in applying the geometric shape filter step 527 used in the smoothing step 512 described above. Smoothing step 512 can selectively adjust a level associated with the geometric filtering based on the amplitude of noise in the system. In preferred embodiment of the geometric shape filter step 527, the amplitude of the root-mean-square (rms) noise is measured based on signal fluctuation with respect to a calculated moving filter average of the amplitude of the acquired scanning signal. As illustrated in FIG. 18, noise can be measured with respect to deviation in the amplitude of the signal along the X axis, deviation in the amplitude of the signal along the Z axis, or both. In particular, step 512 can define and perform the geometric filtering step 527 using an inner region 555 associated with the idealized probe profile 510. Notably, the inner-region 555 is a selective fraction of the size of the idealized probe profile 510, and as such is completely contained within the idealized probe profile 510. Both the idealized probe profile 510 and the inner region 555 can be represented by a combination of convex and/or non-convex regions.

As illustrated in FIG. 18, the idealized probe profile 510 and the inner region 555 are represented by a combination of geometric shapes that include an ellipsoid (representing the probe tip) and a rectangle (representing the probe stalk 560). Although an ellipsoid shape in combination with a rectangle-shape is shown, the type, number and combination of geometric shapes can vary to best characterize the idealized profile 510 of the scanning probe based on previous experience and the complexity of the known shape of the scanning probe. Furthermore, the shape or regions used to represent the inner region may vary from the shapes/regions used to represent the idealized probe profile 510.

The fraction of the idealized probe profile that defines the inner region 555 is a predetermined offset. The predetermined offset can be selectively scaled with respect to noise in the general x-axis direction and noise in the general z-axis direction. Thereby, the extent of the smoothing step 512 can be directly correlated to the noise in the original image data. The predetermined offset includes an x-offset 565 between the inner region 555 and the idealized probe profile 510 in the x-direction. The offset further includes a z-offset 570 between the inner region 555 and the idealized probe profile 510 along the z-direction.

All data points do not need to be tested for inclusion within each translate of the probe tip. Application of the smoothing step 512 can be limited to only candidate original or acquired image data that fall within the extreme left and right limits of the inner region 555 in the x-direction and/or the extreme upper and lower limits in the z-direction. Computational savings are obtained by further restricting the predetermined offset of the idealized probe profile that defines the inner region without degrading the quality of the noise attenuation and filtering.

Median Filter

Figure 20:
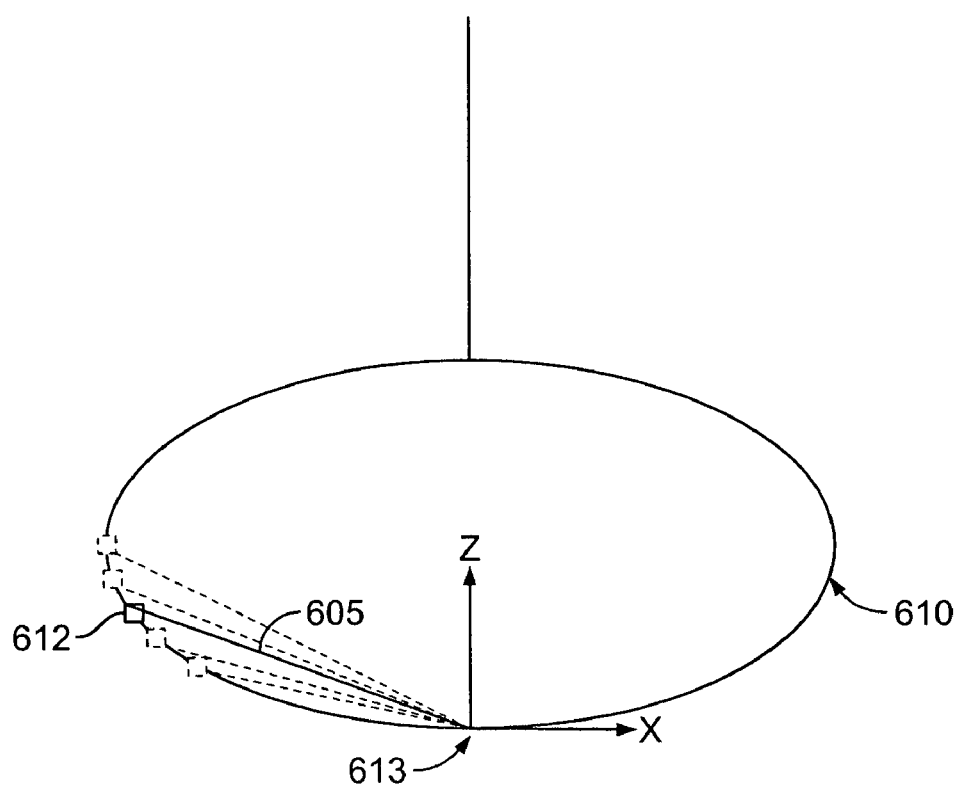
FIG. 20 is a schematic diagram of an idealized probe profile employed in the median filter step.
Figure 21:
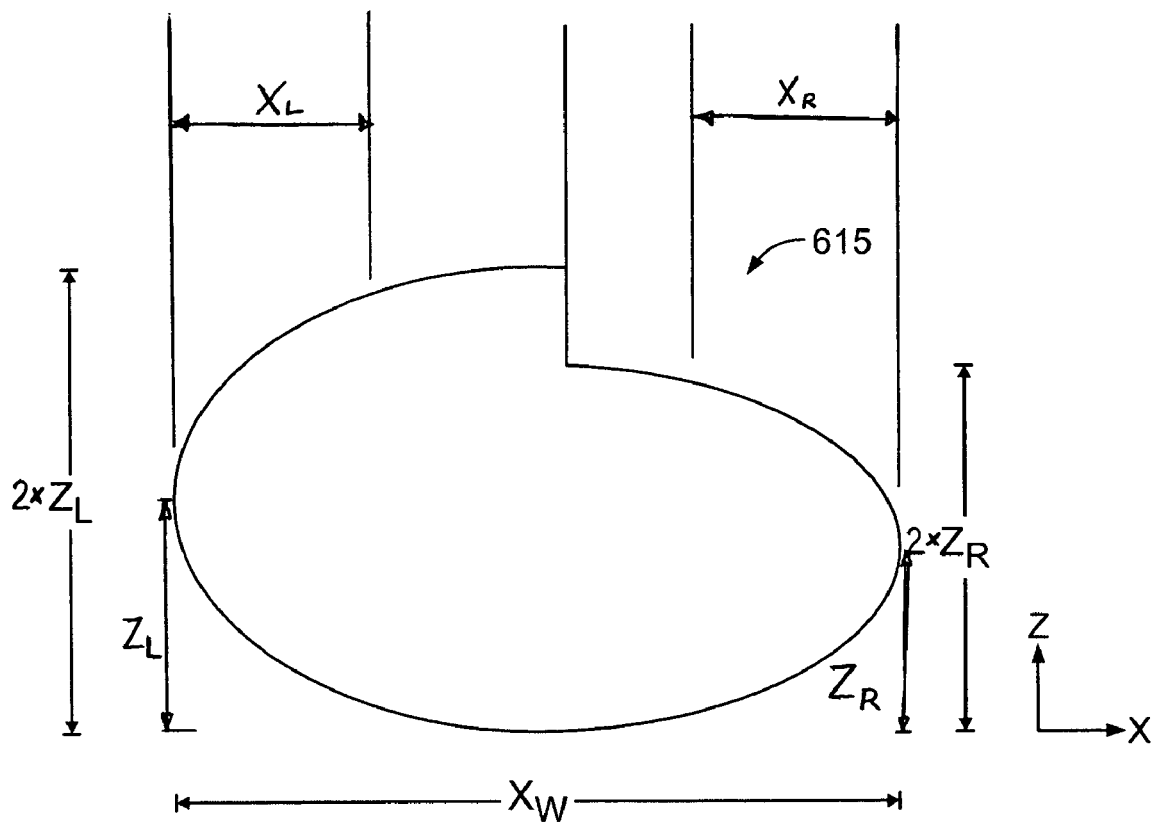
FIG. 21 is a schematic diagram of a window employed in the median filter step, and useful characteristic dimensions for a CD tip.

Referring to FIGS. 19–21, the smoothing step 512 can further include a step 580 of applying a median filter to reconstructed vectors 605 of an idealized probe profile 610. Referring to method 80 illustrated in FIG. 7, the step 580 of applying a median filter is preferably performed after step 98, and thereafter step 580 returns to step 100. In contrast, a certain median filter known in the art is configured to be applied to the acquired image data after step 90 of FIG. 7.

Referring to FIG. 20, the reconstructed vectors 605 are defined by a contact point or matching slope 612 relative to a probe origin 613. Referring to FIG. 21, the step 580 of applying a median filter generally includes applying a "window" 615 to the reconstructed vectors of the idealized probe profile. The window 615 is defined by the geometrical parameters of the idealized probe profile 610 known a priori based on calibration of the probe shape. The reconstruction vectors 605 are filtered in accordance to the window 615 set by the geometrical parameters of the idealized probe profile 610. A preferred window 615 includes a left and a right probe tip vertical edge height ($Z_L$ and $Z_R$), a left and right tip overhang ($X_L$ and $X_R$), and a tip width ($X_W$). In contrast to the known method of applying the median filter to preprocess the original image data, the median filter step 580 of the preferred embodiment is solely applied to the reconstructed vectors 605 based on known geometrical parameters of the idealized probe profile 610.

Figure 22:
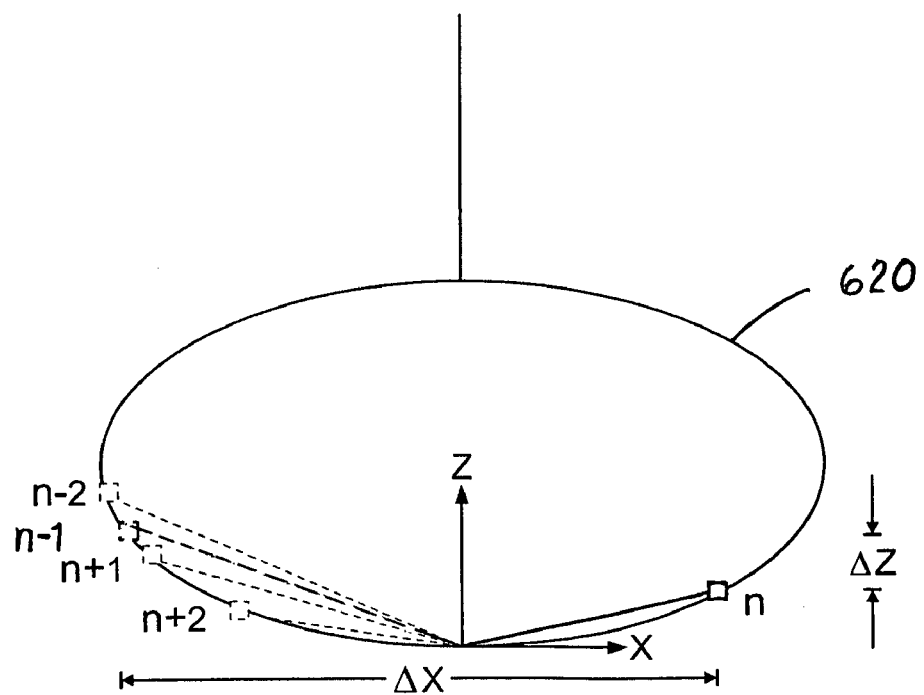
FIG. 22 is a schematic diagram of an idealized probe profile illustrating a flyer point.

FIG. 22 demonstrates how a median filter functions when applied to reconstruction vectors. A sequence of reconstructed vector points (n–2, n–1, n, n+1, n+2) are shown in relation to an idealized probe tip profile 620. Each reconstructed vector point (n–2, n–1, n, n+1, n+2) has been determined from a local slope in a direction as calculated from the original image data. The "flyer" point (n) is excluded when filtering with respect to a measured delta X ($\alpha X$), but not with respect to the measured delta Z ($\alpha Z$). For example, in a first sequence of reconstructed vector points (n–2), (n–1) and (n) tested, the median filter would select point (n–1) based on X or Z position, i.e., $\Delta X$ or $\Delta Z$ when compared to window variables in FIG. 21. Similarly, in a next sequence of reconstructed vector points (n–1), (n) and (n+1), the median filter would also select the same point (n+1). However, in yet a next sequence of reconstructed vector points (n), (n+1) and (n+2) tested, the median filter reveals testing with respect to $\Delta X$ would appropriately exclude flyer point (n) given the sufficiently large $\Delta X$, whereas testing with respect to $\Delta Z$ would select point (n). The median filtering step 580 thereby enhances reduction in noise and noise artifacts superimposed in the reconstructed image. Thereby, less filtering is required of the original image data, less crucial image data is eliminated, and less post-processing of the image data may be necessary. FIG. 22 also illustrates that tip shape, i.e., variables in FIGS. 20–22, for example, can provide improvements in filter selection.

Point Exclusion Based Image Reconstruction

Figure 23:
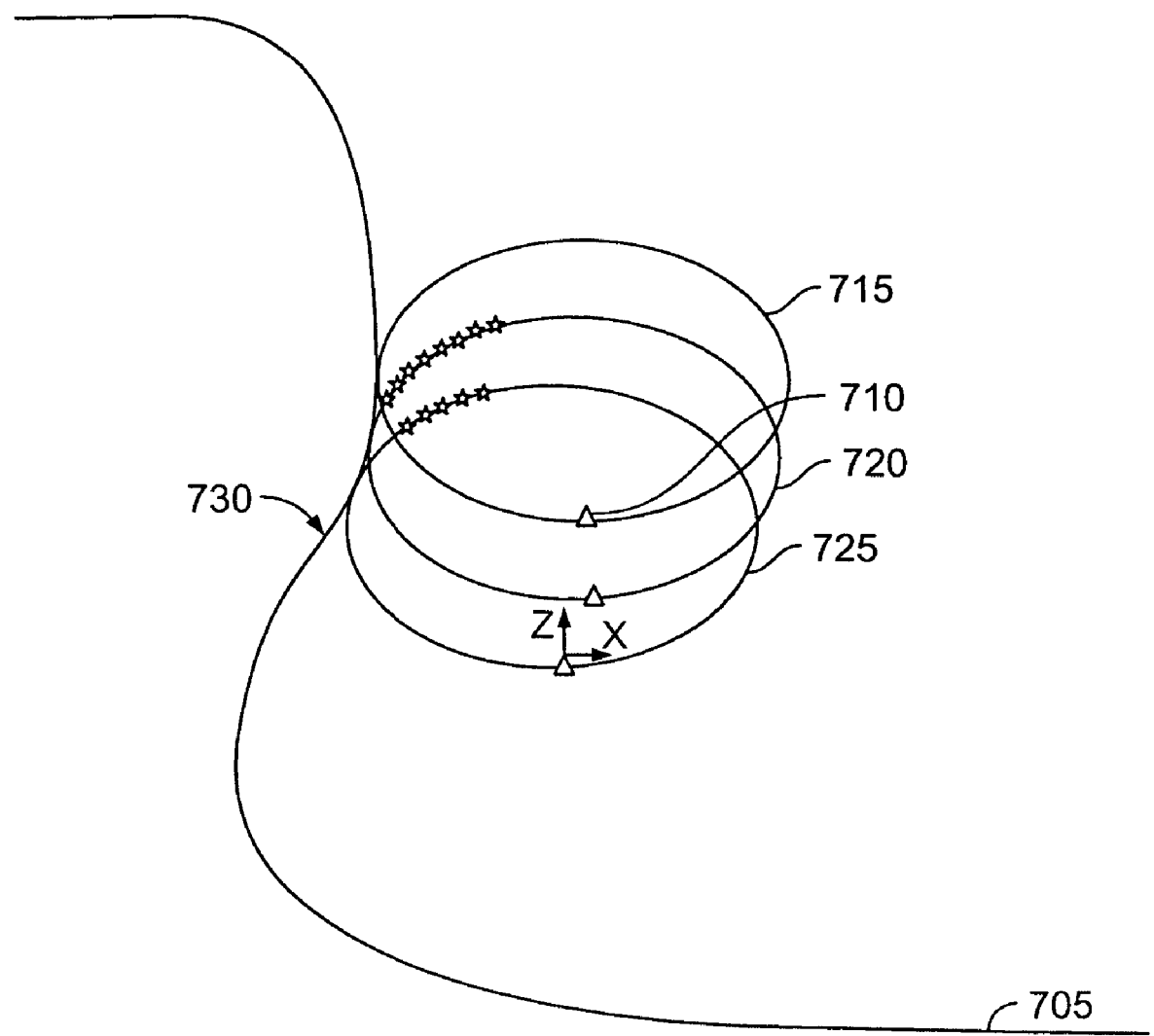
FIG. 23 is a schematic diagram of an original image topology employing a point exclusion-based method of image reconstruction in accordance with a preferred embodiment.
Figure 24:
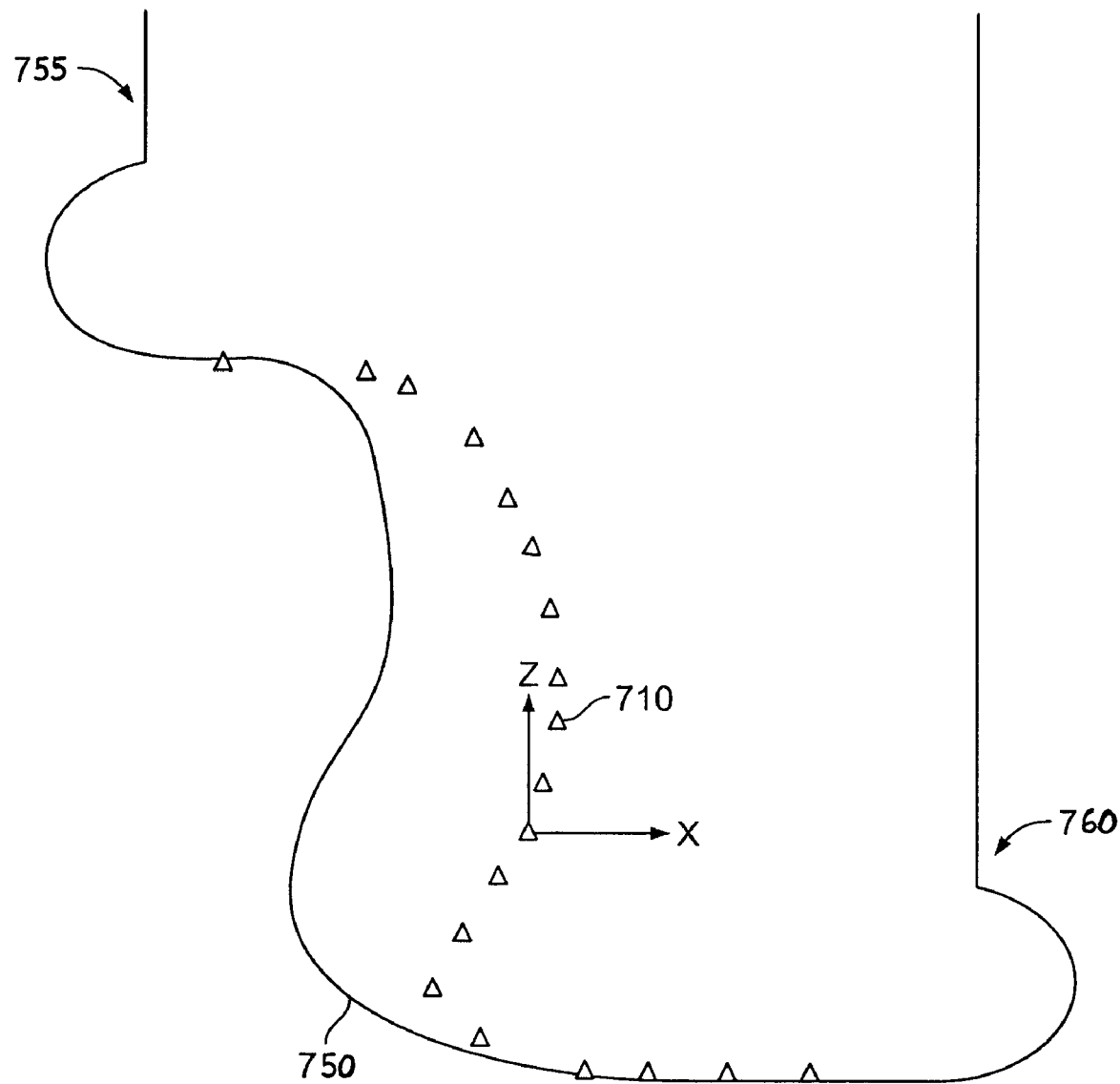
FIG. 24 is a schematic reconstructed image topology defined by the point exclusion method of image reconstruction.

Referring to FIGS. 23–25, another embodiment of a method 700 of image reconstruction of a sample surface 705 is herein referred to as "point exclusion." In contrast to the smoothing or geometric filtering step 512 of slope based method 80 described above, the point exclusion method 700 (see FIG. 25) includes mapping (step 707) all original acquired data (represented by triangular symbols 710), which again corresponds to each base of a sequence of translated idealized probe profiles 715, 720, and 725 obtained in a certain direction of scanning. Notably, FIGS. 23 and 24 illustrate a left-to-right direction of scanning, and the base of each translated probe profile 715, 720, and 725 includes an X-Z coordinate origin.

Figure 25:
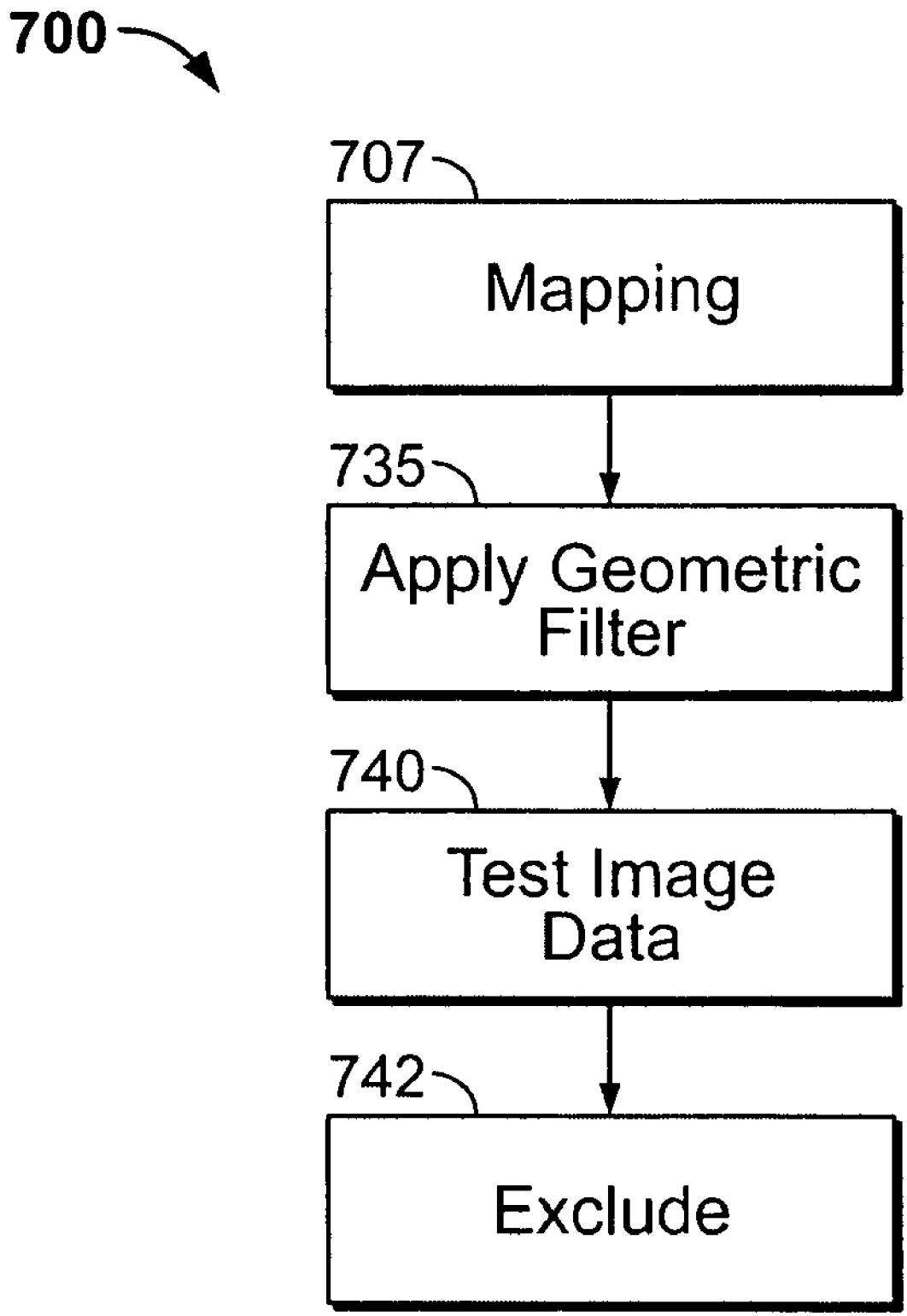
FIG. 25 is flow diagram of a preferred embodiment of the point exclusion based method of image reconstruction.

Referring to FIGS. 23 and 25, step 735 includes applying a geometric-type filter, similar to step 527 described above. Next, FIG. 23 illustrates application of the point exclusion based method 700. In step 735, each idealized probe profile 715, 720, and 725 is defined by an ellipsoid contact region. Starting with the first idealized probe profile 715, the step 740 includes testing to determine, or calculating, the boundaries or limits defining the other idealized probe profiles 720 and 725 that are located within an interior region defined by the geometric shape(s) representative of the first idealized probe profile 715. Known methods in the art can be employed to determine or calculate what points of idealized profiles 720 and 725 fall within the interior regions defined by the geometric shapes that are representative of the idealized probe profile 715. In step 742, the points of portions of line segments of the geometric shape(s) representative of the idealized probe profiles 720 and 725 that are calculated to fall within (as denoted by "stars") the interior region defined by the geometric shape(s) representative of the first idealized probe profile 715 are excluded from the reconstructed image. The process is repeated for each subsequent idealized probe profile 720 and 725. Referring to FIG. 24, the final "reconstructed" image is shown by residual image data represented by line 750, including a residual portion of an initial idealized probe profile 755, a residual portion of a last idealized probe profile 760. Note, the idealized profiles 755 and 760 also incorporate a rectangular region that can be employed to represent the stalk portion extending upward from the scanning probe tip.

The point exclusion method 700 benefits from general geometrical shape simplifications, decomposition of complex shapes into more elementary regions and limiting the candidate tip profiles for testing. Limiting of profile candidates may be conveniently restricted to those occupying the same horizontal region along the x-axis, or even a subset thereof based on tip width. A preferred embodiment of the point exclusion method 742 is to first pre-process acquired original image data with a median filter, then superimpose idealized probe profiles on the filtered image data. The sequential testing of the idealized probe profiles in step 740 and exclusion step 742 leaves a residual, bounding surface represented by line 750 which represents the specimen surface topology.

Notably, methods to reconstruct image data using point exclusion concepts are known, but these known methods are restricted to single-valued, pixilated data. In contrast, the point exclusion method 700 of the preferred embodiment is generalized to all topologies (including multi-valued data and re-entrant surfaces) by the application of data pairs (i.e., [x1, z1], [x2, z2], . . . [$x_n z_n$]) for the two-dimensional image reconstruction and the data triplets (i.e., [x1, y1, z1], . . . [$x_n y_n z_n$]) for three-dimensional image reconstruction. Another benefit of the point exclusion method 700 of the preferred embodiment is that residual reconstructed image surface topology 750 represents the complete specimen topology swept out by the scanning probe. In particular, the method does not leave "image holes" (as they are known in the literature) associated with the slope-method when encountering sudden slope transitions (an example where this occurs is typically at the bottom corner of a sharp trench or line feature). Finally, although the point exclusion method 700 tends to self-filter by the direct application of the geometric shape of the probe tip, the smoothing step 512 and/or the median filter step 580 described above could be performed with method 700.

Profile Tracing

Referring to FIGS. 26–29, yet another embodiment of a method 800 of image reconstruction of a sample surface is herein referred to as "profile tracing." In contrast to the point exclusion method 700 described above, the profile tracing method 800 generally includes testing or analyzing image data with respect to only the boundaries or extreme limits (e.g., the line segments of the geometric shapes) of active and subsequent translated idealized probe profiles, and not image data associated with interior regions of the respective idealized probe profiles. The profile tracing method 800 generally includes sequential testing of the boundaries of translated idealized probe profiles to generate a residual representative of the reconstructed sample surface topology.

Figure 26:
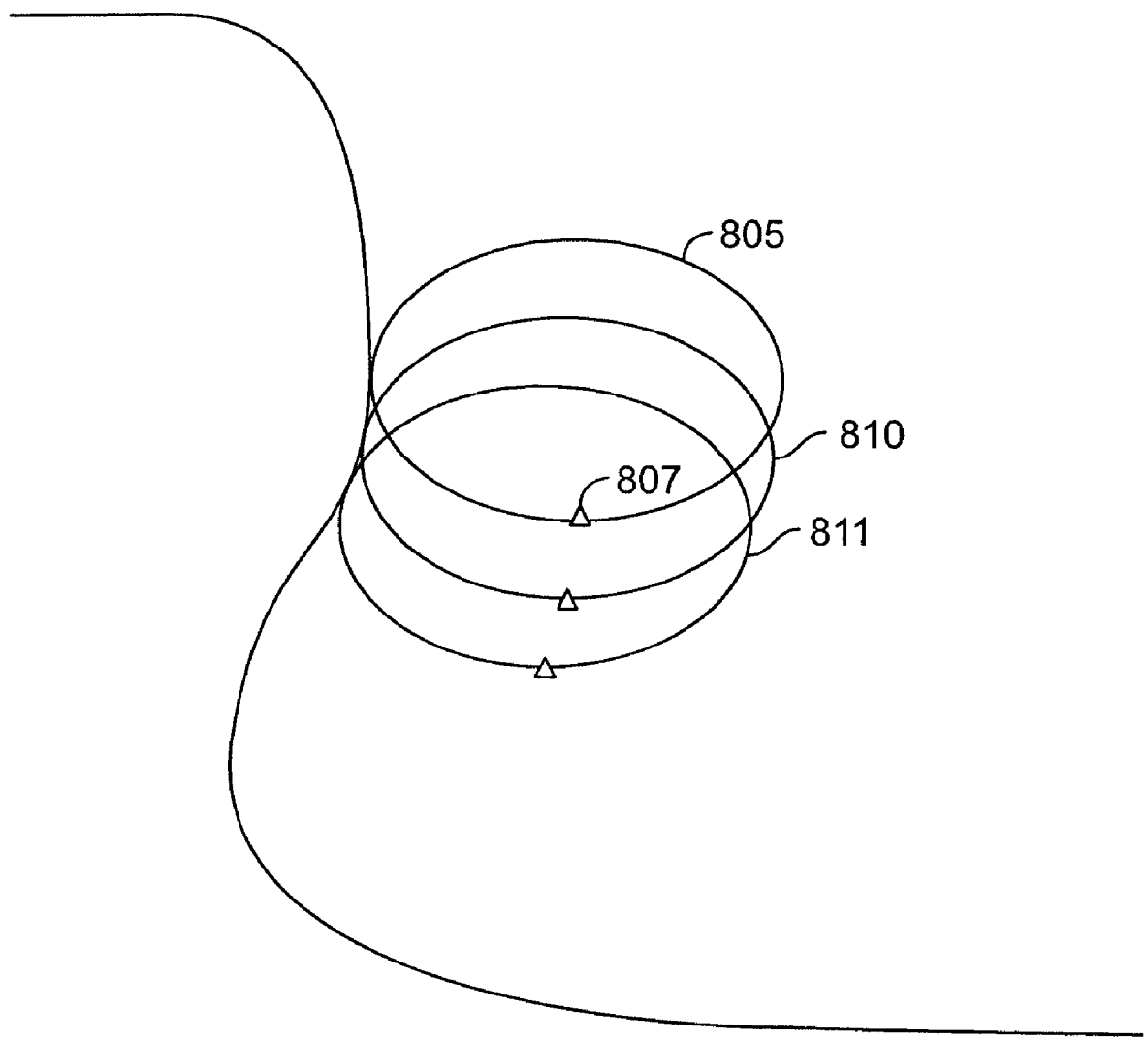
FIG. 26 is a schematic diagram of an original image topology employing a profile tracing method of image reconstruction in accordance with a preferred embodiment.
Figure 29:
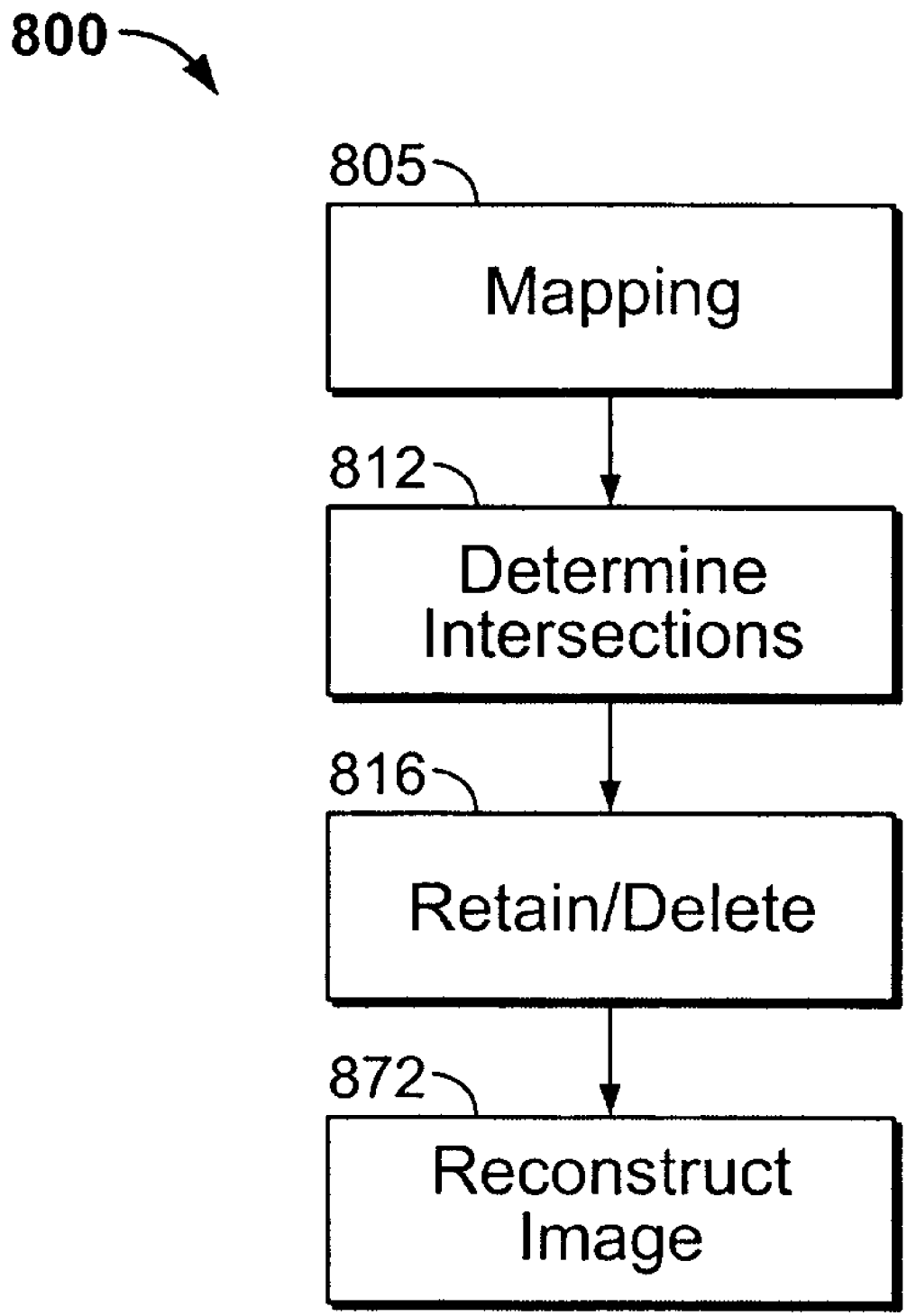
FIG. 29 is a flow diagram of one embodiment of a profile tracing method of image reconstruction.

Referring to FIGS. 26 and 29, the method 800 generally includes mapping (step 805) the acquired original image data (represented by triangular symbols 807) with respect to a first idealized probe profile 805, a second idealized probe profile 810, and a third idealized probe profile 811 of the scanning probe at the location of the respective acquired original image data.

Figure 27:
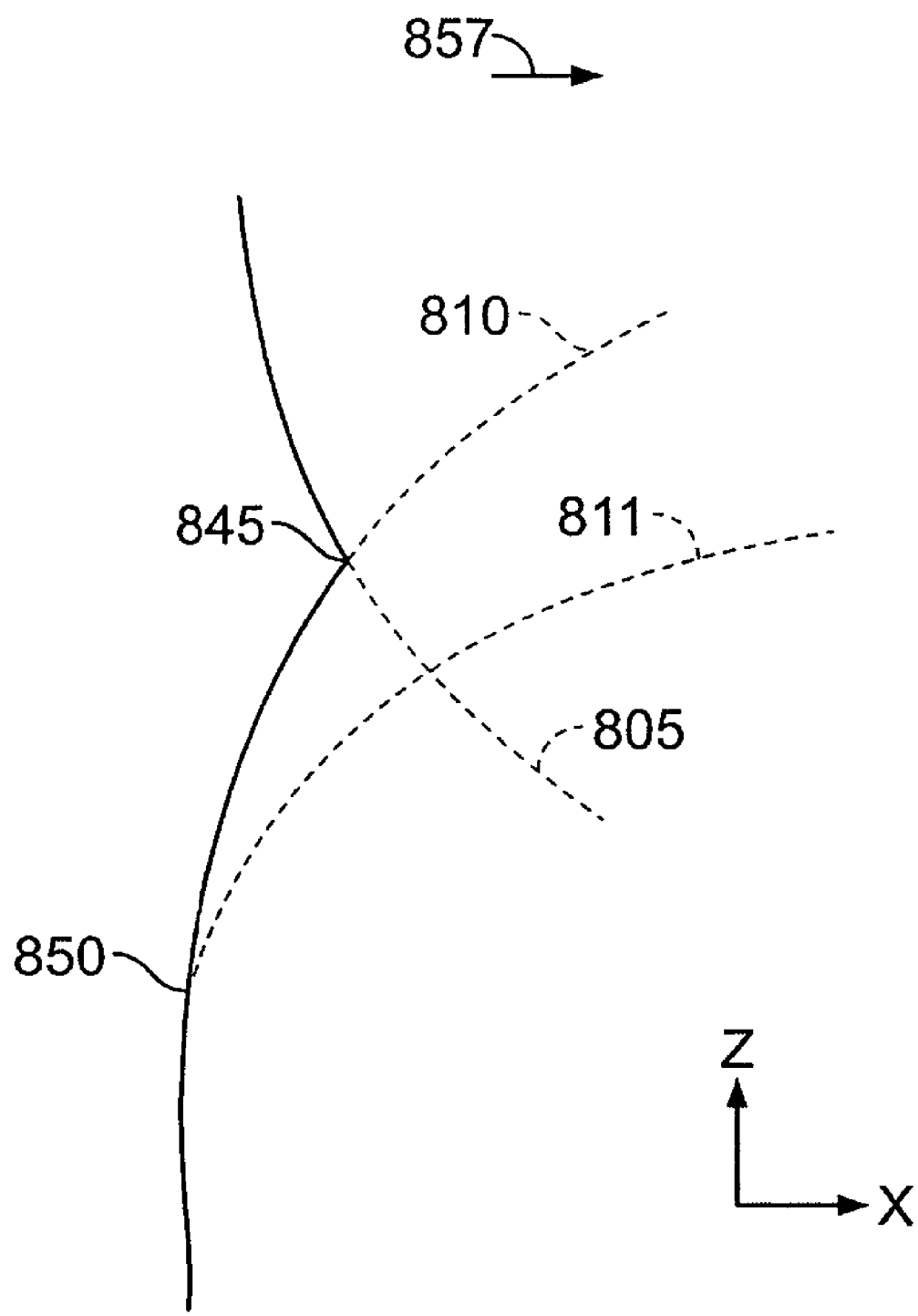
FIG. 27 illustrates a detailed view of a sequence of idealized probe profiles employed in the profile tracing method of image reconstruction in accordance with a preferred embodiment.

Referring to FIG. 27, a detailed view of the first idealized probe profile 805, the second idealized probe profile 810, and the third idealized probe profile 811 is illustrated. The first idealized probe profile 805 is "active" in determining an intersection with the subsequent idealized probe profiles 810 and 811. Referring to FIGS. 27 and 29, the method 800 includes a step 812 of determining or calculating where the first idealized probe profile 805 intersects with the subsequent idealized probe profiles 810 and 811. The methods used in step 812 for calculating the intersections of the line segments representing the idealized probe profiles is performed using known methods in the art. As shown in FIG. 27, the first idealized probe profile 805 intersects the second idealized probe profile 810 at intersection 845. The second idealized probe profile 810 intersects the third idealized probe profile 811 at intersection 850. As a result, the image points or line segments defining the first idealized probe profile 805 up to the intersection 845 is retained (shown by solid line), and the remainder of the ideal profile 805 (shown by dashed line) is excluded or removed from the reconstructed image. Notably, non-adjacent idealized probe profiles (e.g., probe profile 811) must be analyzed as well as the previous second idealized probe profile 810 (adjacent to profile 805) in determining an intersection with the active idealized probe profile 805. Moreover, up to N profiles should be tested in this fashion, where N only need extend to idealized probe profiles in the horizontal region that overlaps or intersects with the currently active idealized probe profile. If multiple sequential idealized probe profiles are found to intersect with the active idealized probe profile, the subsequent idealized probe profile with the intersection that is closest in sequence relative to the active idealized probe profile is retained.

Still referring to FIGS. 27 and 29, once the intersection 845 is calculated or determined, step 816 generally includes retaining the idealized probe profile 805 up to the intersection 845 on an active image reconstruction profile (see line 856 in FIG. 28), and excluding or removing the residual points or portions of the line segment of the idealized probe profile 805 are located beyond or subsequent to the intersection 845 relative to the direction of scanning (illustrated by arrow 857). An algorithm is applied such that the residual portion of the second idealized probe profile 810 following the intersection 845 is retained as a candidate for determining intersections with subsequent idealized probe profile 811 relative to the direction of scanning 857.

Figure 28:
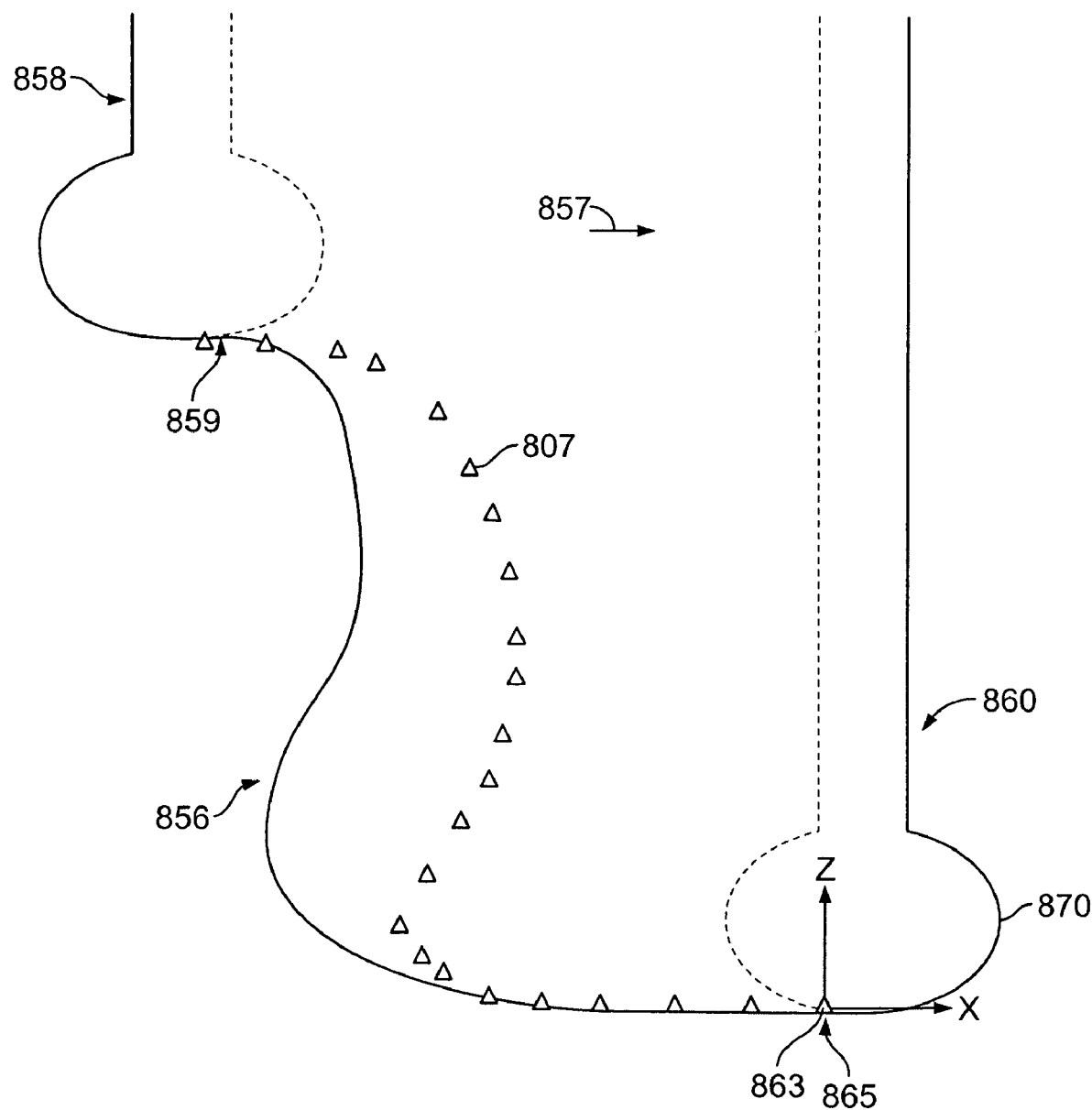
FIG. 28 is a schematic diagram of a reconstructed image topology defined by the profile tracing method of image reconstruction.

FIG. 28 illustrates generating a final reconstructed image (step 872 in FIG. 29, represented by line 856). The acquired original image data (represented by the triangular symbols 807) is shown superimposed on the reconstructed image

856. The final reconstructed image 856 is calculated or defined by the residual image points or line segments starting from an initial probe profile 858 and extending until a last or final idealized probe profile 860. In regard to the initial idealized probe profile 858, the subsequent portion (shown as a dashed line) of the idealized probe profile 858 following the intersection point 859 is excluded. Moreover, in regard to the last idealized profile 860 associated with a location of a last acquired original image data (illustrated by triangular symbol 863), the preceding portion (shown as dashed line) of the last idealized probe profile 860 up to the last calculated intersection 865 is excluded. The reconstructed image 856 thus includes all residual image points of the last idealized probe profile 860 following after, and including, the last intersection point 865.

Although computationally intensive, the profile tracing method 800 can benefit from general geometrical shape simplifications of the idealized probe profiles (similar to the smoothing step 512 described previously) and limiting the candidate idealized probe profiles for testing. As mentioned above, the limiting of the candidate idealized probe profile may be conveniently restricted to those occupying the same horizontal region along an x-direction, or a subset of the horizontal region, based on an idealized probe profile horizontal width. Also, the reconstructed image generated by the method 800 can be enhanced by initially pre-processing the acquired original image data with a median filter similar to step 580 as describe previously, then superimposing the idealized probe profiles on the filtered original image data and calculating the intersections as described above. Another embodiment (not shown) of the method 800 includes initially calculating all the intersection points of all of the translated idealized probe profiles in the sequence, and then proceeding to select an active probe profile based on the most recent, or lowest, "N" point intersection (in the current active profile) in the sequence and repetitively identifying intersections with subsequent idealized probe profiles.

In contrast to certain known methods in the art, the method 800 is not restricted to single-valued, "pixilated data." Instead, the profile tracing method 800 in accordance with the invention may be generalized to all surface topologies including multi-valued data and re-entrant surfaces by the application of data pairs for the two-dimensional analysis and data triplets for three-dimensional analysis. The profile tracing method 800 provides a complete specimen surface topology 856 represented by the remaining (or residual) reconstructed data swept out by the scanning probe. In addition, the profile tracing method 800 tends to be self-filtering by the direct application of the geometric shape representative of the idealized probe profile. Finally, although the profile tracing method 800 tends to self-filter by the direct application of the geometric shape of the probe tip, the smoothing step 512 and/or the median filter step 580 described above could be performed with method 800.

Profile Tangent Method

Figure 30:
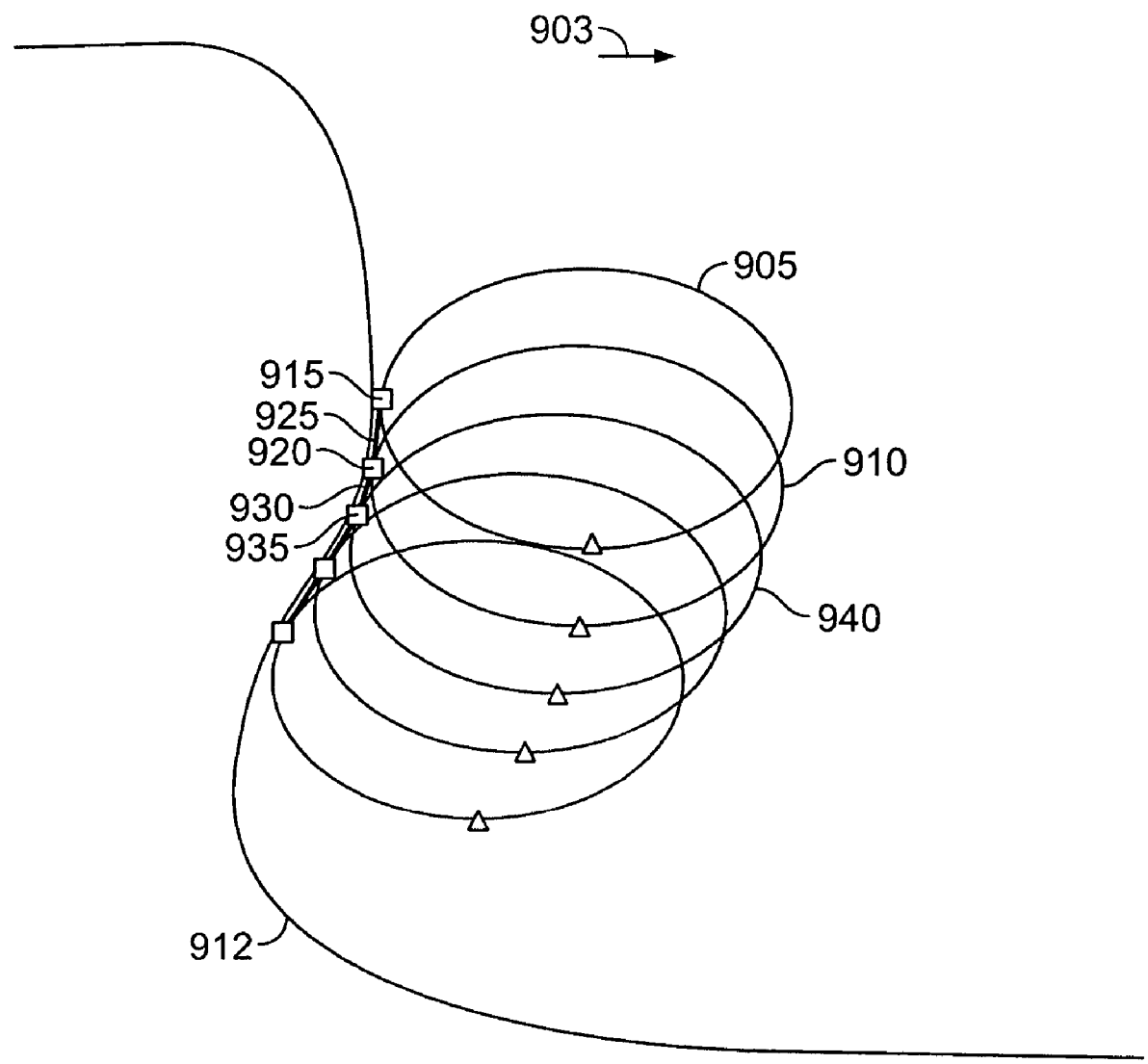
FIG. 30 is a schematic diagram of an original image topology employing a profile tangent method of image reconstruction in accordance with a preferred embodiment.
Figure 31:
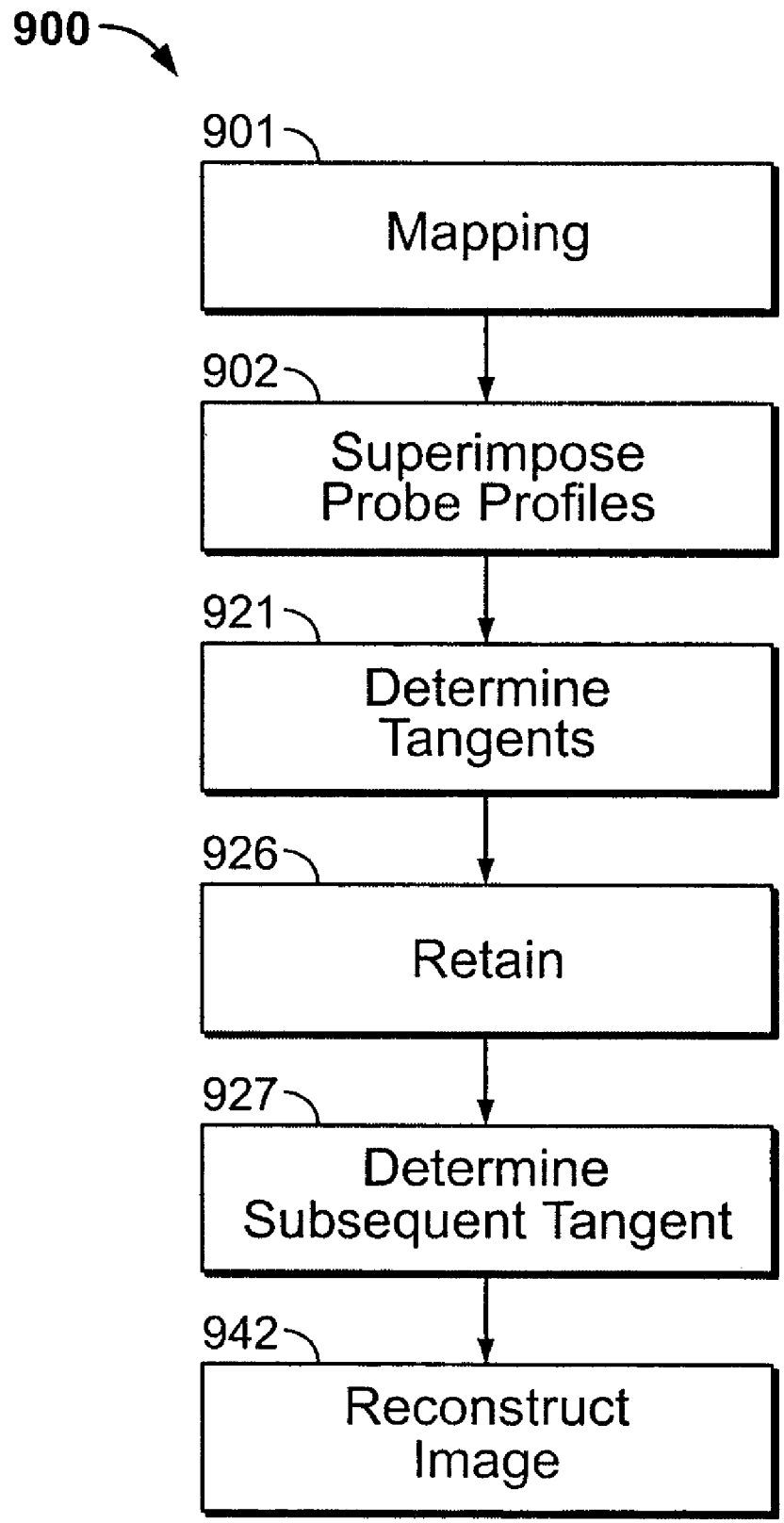
FIG. 31 is flow diagram of one embodiment of a profile tangent method of image reconstruction.

FIGS. 30 and 31 illustrate another embodiment of a method 900 of image reconstruction herein called the profile tangent method. In contrast to the profile tracing method 800 described above, the profile tangent method 900 does not generate a reconstructed image that follows the image points and/or line segments that comprise the geometric shapes used to define the idealized probe profiles. Rather, the profile tangent method 900 generally starts from one valid contact point and then links up to the next tip translate by identifying a line, anchored from the first contact point and just connecting with the subsequent tip translate by "touching" it at a first point of tangency. The tangency point between the line and tip region (or translate) then serves as an anchor point for the next linked line.

Referring to FIGS. 30 and 31, the profile tangent method 900 includes mapping (step 901 in FIG. 31) original image data (shown as triangular symbols), and superimposing translated idealized probe profiles relative to the location of the acquired original image data (step 902 in FIG. 31). FIG. 30 illustrates a sequence of idealized probe profiles in a left to right direction of scanning (illustrated as arrow 903), including a first idealized probe profile 905 and a second idealized probe profile 910 in relation to a sample surface 912.

The profile tangent method 900 further includes testing or calculating (step 921 in FIG. 31) a first point of tangency 915 of the first profile 905 with the sample surface 912. Step 921 further includes testing or calculating a line 925 defined between the first tangency point 915 of the first idealized probe profile 905 and a point 920 of the second idealized probe profile 910 where the line 925 is just tangent to the probe profile 910. Step 922 (see FIG. 31) includes retaining line segments or image points that define the initial idealized probe profile 905 up to (relative to the direction of scanning 903) the first contact point 915 and including the tangent line 925 itself. In calculating the tangent lines, known algorithms or methods in the art can be used to calculate a tangent line between a point and a polygon, and between two polygons. The second tangent point 920 of the second idealized probe profile 910 then serves as a starting point in determining (step 927 in FIG. 31) a subsequent tangent line 930 connecting the second tangent point 920 to a third tangent point 935 of a third idealized probe profile 940. The repetitive linking of the tangent points of the sequence of idealized probe profiles with tangent lines in the direction of scanning 903 (step 942 in FIG. 31) thereby generates or provides a complete, reconstructed image (not shown) of the sample surface topology.

The profile tangent method 900 may be less computationally intensive than other methods of image reconstruction. The profile tangent method 900 may produce fewer noise artifacts in the reconstructed image when processing sparse image data (i.e., a situation where the spacing is of the same order as the probe tip radius of curvature).

Notably, the profile tangent method 900 can be enhanced by first pre-filtering the acquired original image data with the median filter, similar to step 580 described previously. Speed enhancements can be gained by using geometrical shape simplifications of the idealized probe profile as described previously. Moreover, the reconstructed image (not shown) of the profile tangent method 900 can be improved by the post-application of the geometric filter in the smoothing step 512 and/or the median filter step 580 described previously.

The profile tangent method 900 is not limited to single-valued, pixilated data as certain known methods known in the art. Rather, the profile tangent method may be generalized to all surface topologies including multi-valued data and re-entrant surfaces by the application of data pairs for two-dimensional analysis and data triplets for three-dimensional analysis. The profile tangent method 900 is extendable to three-dimensional analysis by substitution of a tangent plane for a tangent line in two-dimensional analysis.

Intersection Point Method

Figure 32:
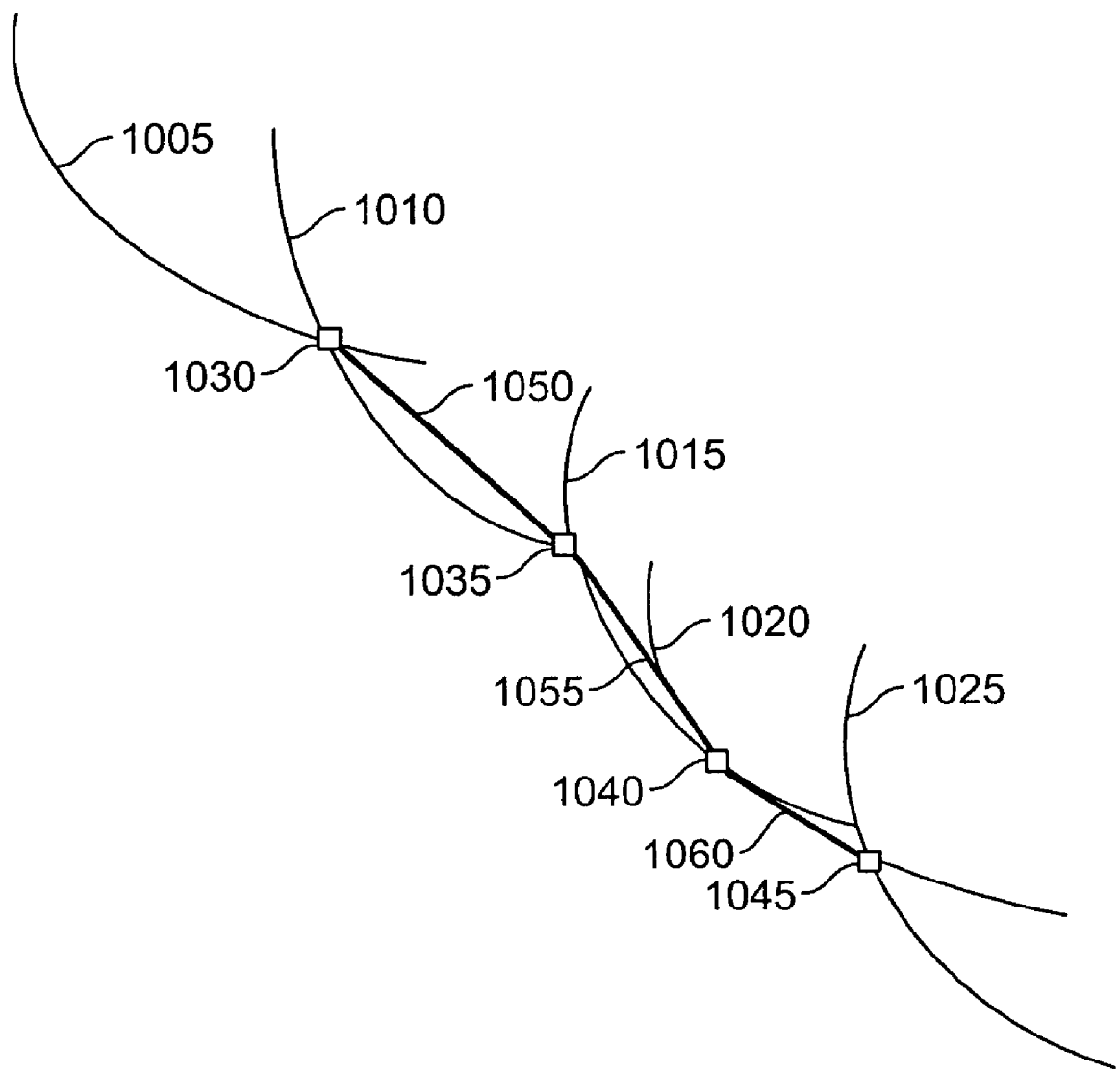
FIG. 32 is schematic diagram of a sequence of translated idealized probe profiles employed in an intersection method of image reconstruction in accordance with a preferred embodiment.
Figure 33:
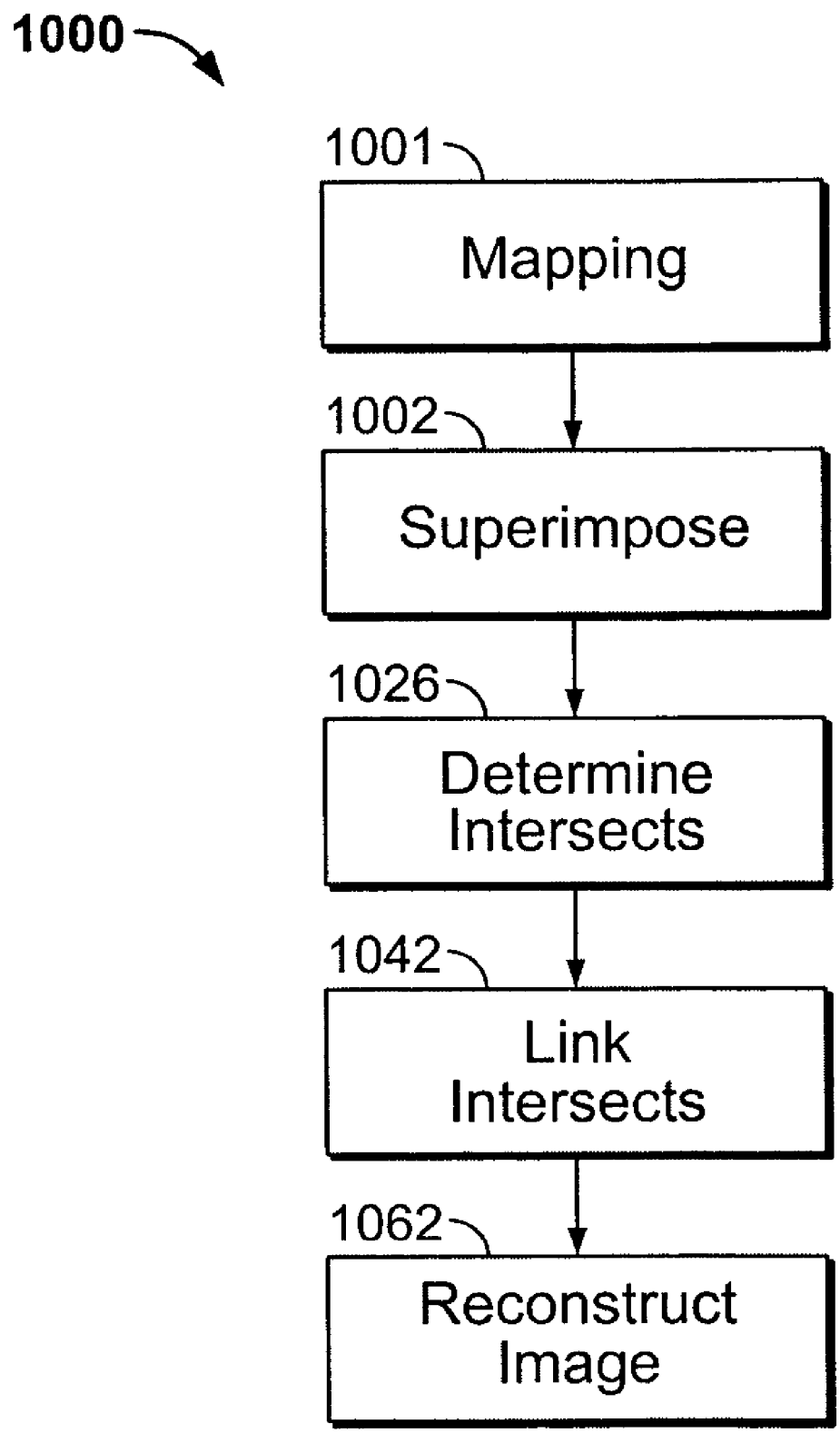
FIG. 33 is a flow diagram of a one embodiment of an intersection point method of image reconstruction.

Another embodiment of a method 1000 of image reconstruction is herein referred to as the "intersection point" method. Referring to FIGS. 32 and 33, the intersection point method 1000 includes mapping (step 1001 in FIG. 33) the original image data (not shown), and superimposing (step 1002 in FIG. 33) the sequence or translations of, for example, a first idealized probe profile 1005, a second idealized probe profile 1010, a third idealized probe profile 1015, a fourth idealized probe profile 1020, and a fifth idealized probe profile 1025 (similar to the step 707 described previously).

Step 1026 (see FIG. 33) includes calculating or determining where the idealized probe profiles 1005, 1010, 1015, 1020, and 1025 intersect one another. As illustrated in FIG. 32, the first and subsequent second idealized probe profiles 1005 and 1010 intersect at intersection point 1030. The second and subsequent third idealized probe profile 1010 and 1015 intersect at intersection point 1035. The third and subsequent fourth idealized probe profiles 1015 and 1020 intersect at intersection point 1040. The fourth and subsequent fifth idealized probe profiles 1020 and 1025 intersect at intersection point 1045. Algorithms known in the art can be used in a known manner to calculate the intersections between idealized probe profiles 1005, 1010, 1015, 1020, and 1025.

The intersection point method 1000 further includes determining or calculating (step 1042 in FIG. 33) line segments 1050, 1055, and 1060 interconnecting or linking the intersections 1030, 1035, 1040 and 1045, respectively. Only the intersections 1030, 1035, 1040, and 1045 and the line segments 1050, 1055, and 1060 linked therebetween are retained in generating or reconstructing a final reconstructed image (not shown) of the sample surface topology (step 1062 in FIG. 33).

A preferred embodiment of the intersection point method 1000 can further include pre-filtering the original data with a median filter, similar to step 580 described previously. The speed of the method 1000 can be enhanced by application of geometrical shape simplifications to represent the idealized probe profiles 1005, 1010, 1015, 1020, and 1025. Following application of the certain known algorithms to locate the intersections 1030, 1035, 1040, and 1045 and the connecting line segments 1050, 1055, and 1060 therebetween, the smoothing step 512 and/or the median filter step 580 described previously can be used following application of the method 1000 to post-filter or remove intersections that would be swept out (e.g., located within the interior region) by the actual probe tip as it moves in the direction of scanning.

In contrast to certain known image reconstruction methods, the intersection point method 1000 is not limited to single-valued pixilated data as other certain known methods. Rather, the intersection point method 1000 may be generalized to all surface topologies including multi-valued data and re-entrant surfaces by the application of data pairs for two-dimensional analysis or data triplets for three-dimensional analysis.

Boundary Erosion Method

Figure 34:
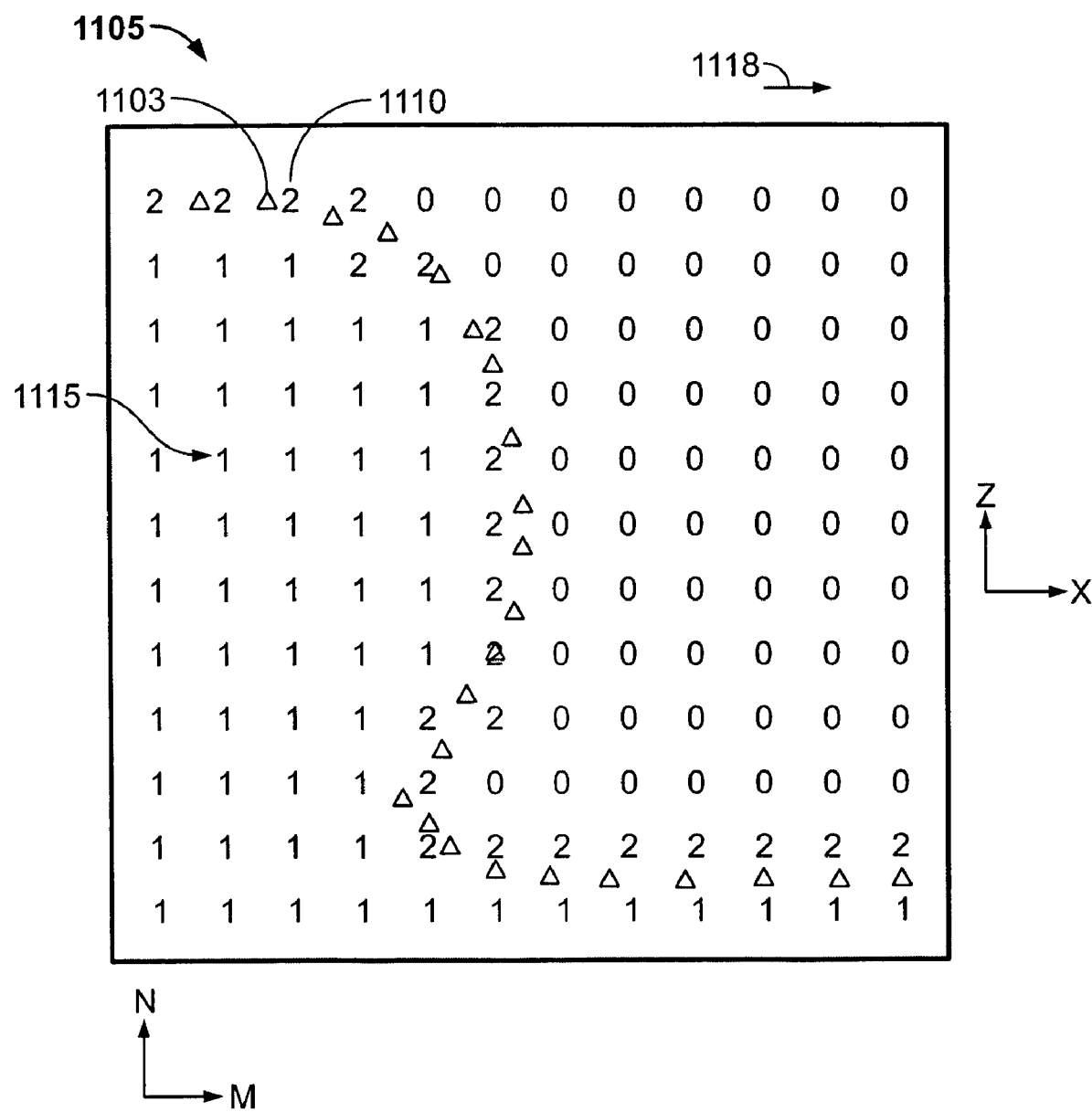
FIG. 34 is a grid of an array of pixilated image data illustrating a boundary erosion method of image reconstruction in accordance with a preferred embodiment.

FIGS. 34–37 illustrate still another method 1100 of image construction in accordance with the present invention referred to as "boundary erosion." The boundary erosion method 1100 in general includes converting re-entrant data pairs and data triplets to a pixel-type array (e.g., array of values illustrated in FIG. 34). The pixel array defined by the original image data (shown as triangular symbols 1103) is then dilated or eroded by applying known algorithms in a known manner with respect to binary or grayscale morphology to a selected or active pixel with respect to its neighboring pixels. Of particular interest is erosion because the original surface topology is automatically dilated by the probe tip shape during scanning. For binary or grayscale morphology, "erosion" generally involves calculating or determining whether to set the value of an active pixel to the minimum value of all pixels in the neighborhood, as defined by an idealized probe profile. In contrast to certain known methods, the selected or active pixel is limited in range to only the boundary pixels defined by the acquired original image data.

Figure 37:
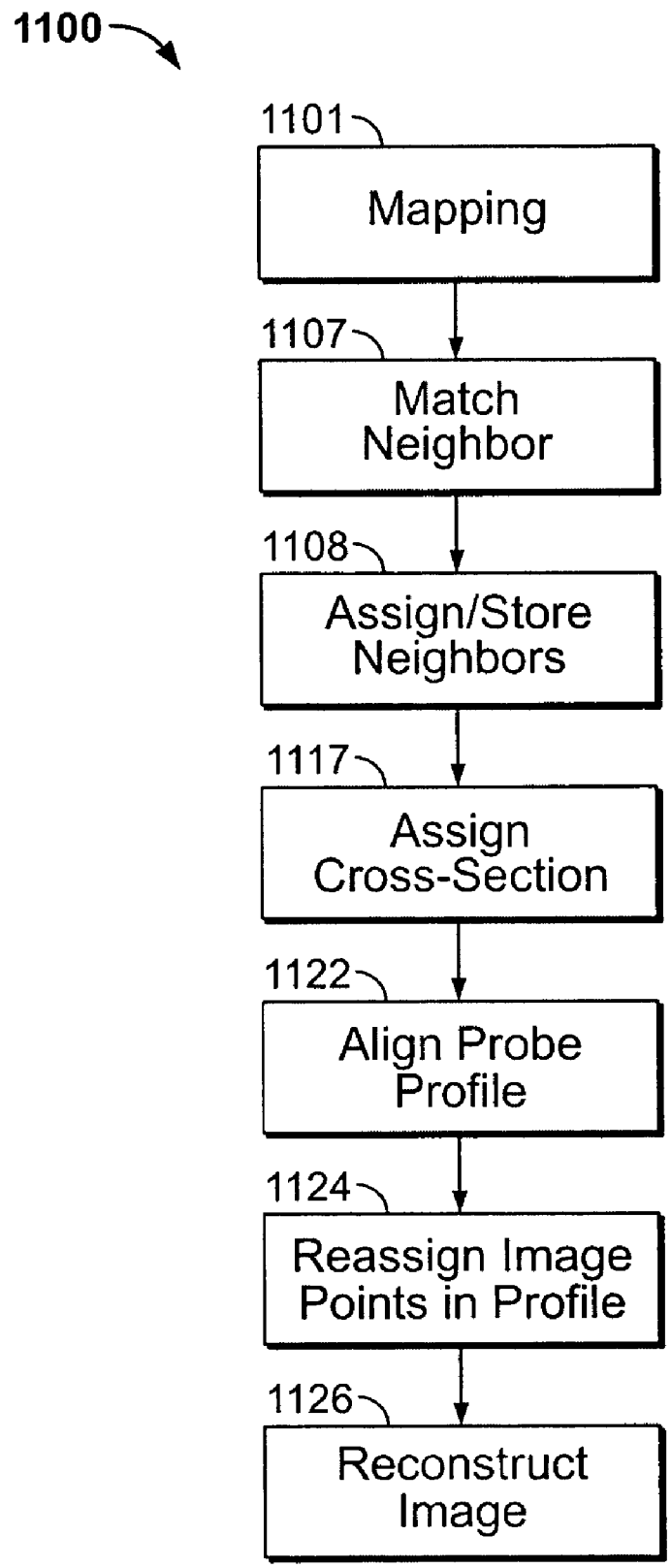
FIG. 37 is a flow diagram illustrating one embodiment of the boundary erosion method of image reconstruction.

Referring to FIGS. 34 and 37, the method 1100 includes mapping (step 1101 in FIG. 37) the original image data pairs (shown as triangular symbols 1103) on an X-Z grid 1105. The X-Z grid 1105 includes a pixel-type array with assigned values (i.e., 0, 1, and 2) representative of a morphological state. In a preferred embodiment, each pixel in the array is initially assigned a value of zero as representative of background state. Reference 1110 illustrates, by way of example, calculating or determining (step 1107 in FIG. 37) a nearest neighboring pixel with respect to each superimposed original image data pair 1103 (or data triplets in three-dimensional analysis). The step 1107 of determining or calculating the nearest neighboring pixel can be performed in a known manner using "nearest neighbor"—determining algorithms known in the art. Step 1108 includes assigning and storing a value of "1" to each nearest matched neighboring pixel 1110. In step 1108, the identified nearest neighboring pixel 1110 is stored in a separate X-Z grid 1112 that will be used to compare with the reconstructed image grid.

Alternatively, the determined nearest neighboring pixel 1110 may be conveniently converted to another value (e.g., "2's") and used directly in the active X-Z grid 1105 under analysis. By way of example and in reference to pixel 1115 in FIG. 34, the method 1100 further includes assigning (step 1117 in FIG. 37) a state value of "1" to a pixel 1115 in the array that is within a "boundary" defined by the pixel state values of "2" and in reference to a direction of scanning (illustrated by arrow 1118). The pixel state values of "1" thus represent a cross-section of the specimen, and the pixel state values of "2" thus represent a surface. In the case of storing a separate grid to represent the boundary, all interior specimen pixels in the active (or "reconstructed") grid would also be converted to "1".

Figure 35:
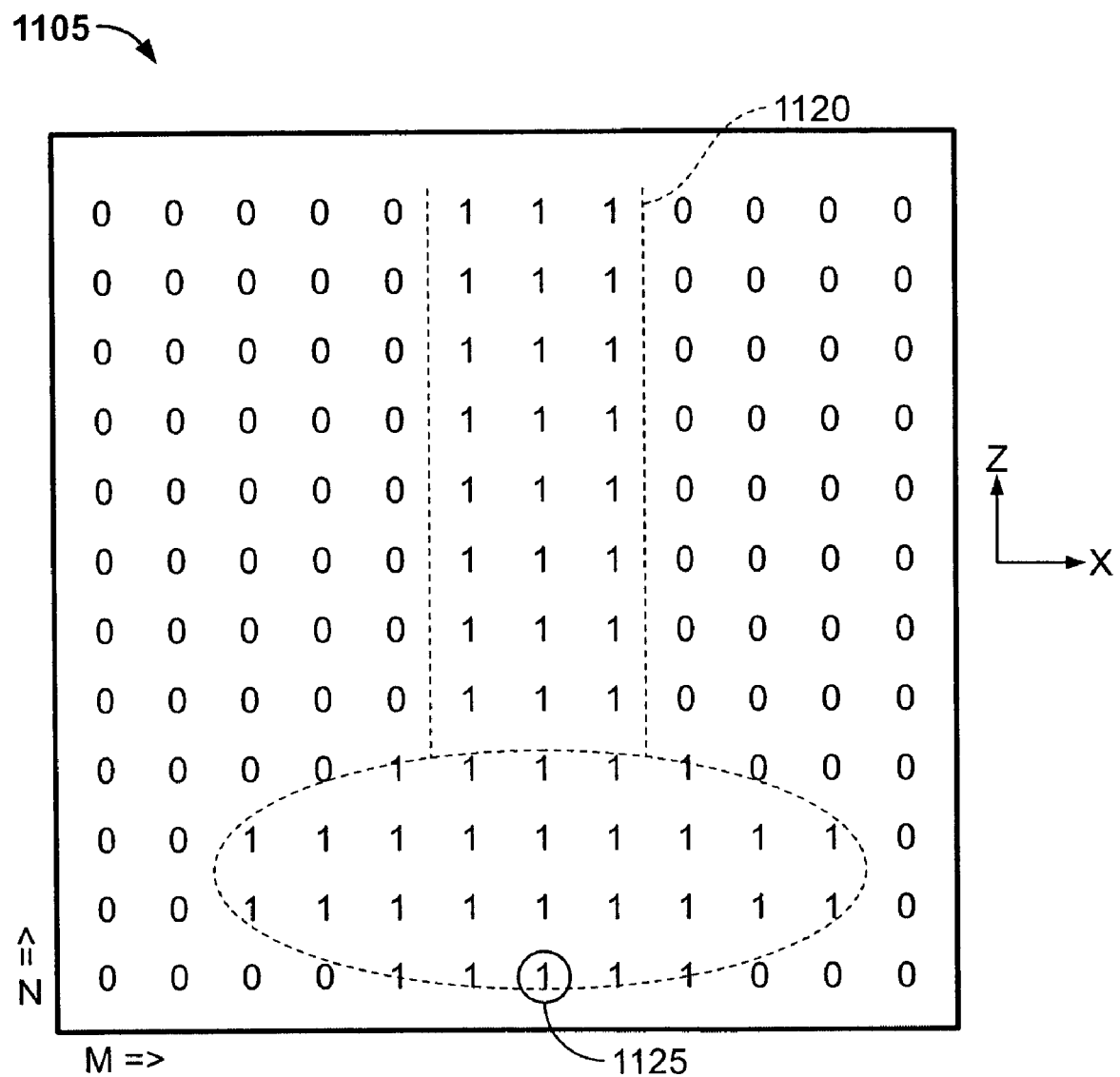
FIG. 35 is an array of pixilated data representative of an idealized probe profile employed in the boundary erosion method in accordance with a preferred embodiment.

Referring to FIG. 35, an idealized probe profile 1120 (shown as a dashed line) is also treated in a similar fashion. Binary values (e.g., "1's") are used in a known manner to define the active pixels 1125 with respect to pixels assigned with a background state of "0." The active pixels preferably include pixels located in an interior region defined by the idealized probe profile 1120. Yet, although the boundary erosion method 1100 is illustrated using binary values of 0's and 1's, or other integers (e.g., "2" to signify a boundary), the method 1100 is not limited to these binary numerals, binary images or specific numerical values.

Figure 36:
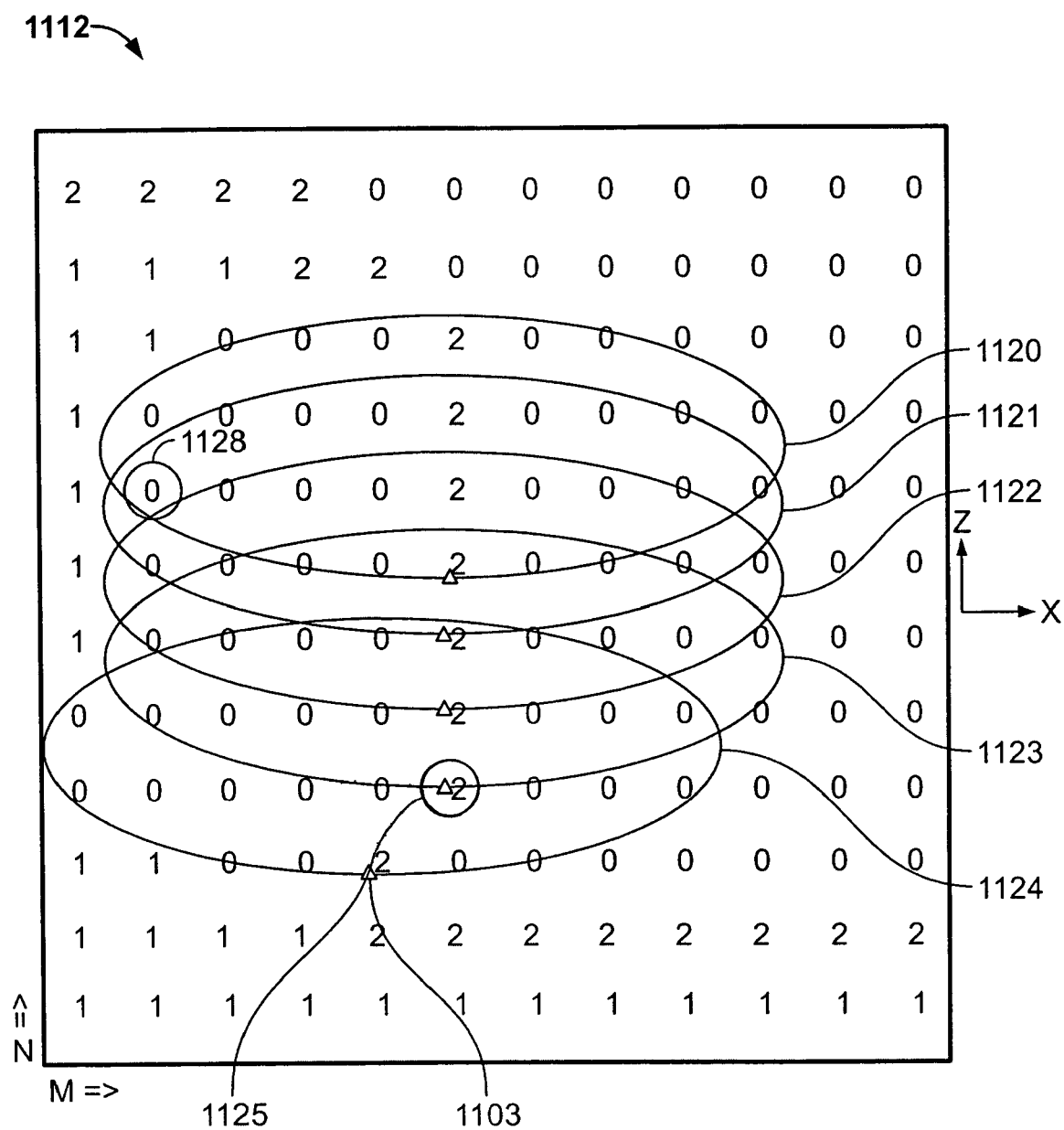
FIG. 36 is a sequence of translated idealized probe profiles illustrating the boundary erosion method of image reconstruction.

In particular, the tip array (referred to as a "structuring element" in image morphology) has its origin, the pixel shown as 1125 in FIG. 35 aligned with the boundary point in the reconstructed image. Referring to FIG. 36, step 1122 (see also FIG. 37) identifies mapping the tip structuring element to the image boundary point (e.g., point 1125 shown for the idealized probe profile 1123). Step 1124 includes calculating or simple numerical comparison between all "active" pixels represented by values of "1" in the idealized probe profile 1120 of FIG. 35 and the active image pixel in the reconstructed image. Those image pixels found to fall within the boundary limits of the probe profile are re-assigned with a background state value of "0's" (e.g., pixel 1128 falls within idealized probe profile 1120 and 1121). These steps are repeated in application of the tip structuring element to all image pixels following alignment of the tip profile or structuring element to original image points.

Step 1126 includes generating a reconstructed specimen surface topology (not shown) as it is defined by the residual "1's" in the pixel array. The pixel array thus defines a reconstructed specimen surface topology and a cross-section (e.g., represented by "1's") of the specimen. In a preferred embodiment of the method 1110 (i.e., not using a separate boundary array or grid), the reconstructed pixel array uses 2's to indicate boundary points of the acquired surface topology as well as the origins of the idealized probe profiles 1120, 1121, 1122, 1123, or 1124, the 2's can be converted to 0's at the end of the processing sequence. Finally, if desired, the pixel array can be converted back to a string of sequenced format data (e.g., data pairs or triplets) representing the specimen surface topology.

The boundary erosion method 1100 can be enhanced with pre-filtering the original image data with a median filter similar to step 580 described previously. In addition, the speed of the method 1100 can be enhanced with use of geometric simplifications and resorting to an X-Z array in two-dimension analysis or X-Y-Z array in three-dimensional analysis. The method is easily extensible to three-dimensional analysis with use of the three-dimensional image arrays, three-dimensional image representations of the probe tip shape, and algorithms for nearest neighbor selection in three-dimensional space. The smoothing step 512 and/or the median filter step 580 described previously could be performed with the method 1100 to post-filter or remove intersections that would be swept out (e.g., located within the interior region) by the actual probe tip as it moves in the direction of scanning.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

What is claimed is:

1. A method of extracting the shape of a tip of a probe-based instrument from data obtained by the instrument, the method comprising the steps of:
    generating an image using the data, the data being indicative of a characteristic of a surface of a sample;
    calculating a slope of the image at a particular region; and
    determining, using the slope, a probe contact point between the tip and the sample surface at the region;
    translating an image point based on the probe contact point using a correction vector;
    repeating the above steps for at least two points in the image data so as to generate corrected image data;
    generating a corrected image plot based on the corrected image data; and
    filtering the corrected image plot.

2. The method of claim 1, wherein the filtering step includes geometric filtering that includes excluding corrected image data that falls within a region defined by a probe profile representative of the probe tip at a location of the data acquired by the instrument.

3. The method of claim 2, wherein the corrected image plot is characterized by a first probe position, a second probe position, and a third probe position defining a first corrected image data, a second corrected image data, and a third corrected image data, respectively.

4. The method of claim 2, wherein a portion of the corrected image plot that falls within the region defined by the profile of the probe tip is excluded from the corrected image plot.

5. The method of claim 4, wherein the probe profile includes one or more geometric shapes representative of the probe tip.

6. The method of claim 5, wherein the probe profile includes an inner region, and wherein the inner region is a predetermined fraction of the idealized probe profile.

7. The method of claim 6, wherein the inner region is completely contained with the idealized probe profile.

8. The method of claim 7, wherein the inner region is a first fraction of the idealized probe profile along a first direction, and a second fraction of the idealized probe profile along a second direction.

9. The method of claim 8, wherein both the idealized profile and the inner region include a stalk portion that is represented by a combination of one or more geometric shapes.

10. The method of claim 9, wherein the inner region is selectively scaled according to noise in the original image data.

11. The method of claim 10, wherein the inner region defines a first offset in a first axial direction, and a second offset in a second axial direction.

12. The method of claim 5, wherein the filtering step includes removing image data that falls within a region defined by limits of the inner region in a first axial direction.

13. The method of claim 12, wherein the smoothing step includes removing image data that falls within a region defined by limits of the inner region in a second axial direction.

14. The method of claim 13, wherein the filtering step includes removing image data that falls within a region defined by limits of the inner region in a third axial direction.

15. A method of extracting the shape of a tip of a probe-based instrument from data obtained by the instrument, the method comprising the steps of:
    generating an image using the data, the data being indicative of a characteristic of a surface of a sample;
    calculating a slope of the image at a particular region; and
    determining, using the slope, a probe contact point between the tip and the sample surface at the region;
    translating an image point based on the probe contact point using a correction vector;
    applying a median filter to the correction vector;
    repeating the above steps for at least two points in the image data so as to generate corrected image data; and
    generating a corrected image plot based on the corrected image data.

16. The method of claim 15, wherein the probe tip includes geometrical parameters known a priori based on calibration of the probe.

17. The method of claim 16, wherein the step of applying the median filter includes filtering the corrected image data with a defined window based on the geometrical parameters of the probe tip.

18. The method of claim 17, wherein the defined window includes a left and a right probe tip vertical edge height ($Z_L$ and $Z_R$), a left and right tip overhang ($X_L$ and $X_R$), and a tip width ($X_W$).

19. The method of claim 18, wherein the step of filtering with the window includes excluding correction vectors falling outside the window.

20. A method of extracting the shape of a tip of a probe-based instrument from data obtained by the instrument, the method comprising the steps of:

generating an image using the data, the data being indicative of a characteristic of a surface of a sample and corresponding to a plurality of scan positions of the sample;

calculating at least one slope of the image at a first scan position, wherein a plurality of data points correspond to the first scan position;

determining, using the slope, a probe contact point between the tip and the sample surface at the first scan position;

producing at least a portion of a corrected image plot based on the probe contact point; and filtering the corrected image plot.

* * * * *